United States Patent [19]

Wijaya

[11] Patent Number: 5,787,300
[45] Date of Patent: Jul. 28, 1998

[54] METHOD AND APPARATUS FOR INTERPROCESS COMMUNICATIONS IN A DATABASE ENVIRONMENT

[75] Inventor: Joyo Wijaya, Menlo Park, Calif.

[73] Assignee: Oracle Corporation, Redwood City, Calif.

[21] Appl. No.: 584,910

[22] Filed: Jan. 11, 1996

Related U.S. Application Data

[63] Continuation of Ser. No. 150,592, Nov. 10, 1993, abandoned.

[51] Int. Cl.$^6$ .................................................. G06F 13/00
[52] U.S. Cl. .................. 395/800.01; 395/800.26; 370/282; 370/299; 364/DIG. 1
[58] Field of Search ................ 395/800.01, 800.26; 370/282, 299; 364/DIG. 1

[56] References Cited

U.S. PATENT DOCUMENTS

| | | | |
|---|---|---|---|
| 4,862,350 | 8/1989 | Orr et al. | 395/250 |
| 5,148,527 | 9/1992 | Basso et al. | 395/325 |
| 5,214,759 | 5/1993 | Yamoaka et al. | 395/325 |
| 5,247,626 | 9/1993 | Firoozmand | 395/250 |
| 5,265,250 | 11/1993 | Andrade et al. | 395/650 |
| 5,287,453 | 2/1994 | Roberts | 395/200 |
| 5,287,456 | 2/1994 | Rhode et al. | 395/200 |
| 5,313,638 | 5/1994 | Ogle et al. | 395/725 |
| 5,321,808 | 6/1994 | Rupp | 395/164 |
| 5,325,492 | 6/1994 | Bonevento | 395/325 |
| 5,329,619 | 7/1994 | Page et al. | 395/200.01 |
| 5,371,850 | 12/1994 | Belsan et al. | 395/200 |

*Primary Examiner*—Alyssa H. Bowler
*Assistant Examiner*—Dzung C. Nguyen
*Attorney, Agent, or Firm*—Fliesler Dubb Meyer & Lovejoy LLP

[57] ABSTRACT

The present invention provides interprocess communication in a DBMS. The present invention provides the ability for these processes to communicate with other DBMS processes or processes external to the DBMS. A pipe is implemented as an object of the general purpose object cache. The general purpose object cache resides in the systems shared memory space. It is concurrently accessible by many sessions, or processes. A pipe is located in a shared global memory area. The present invention provides the ability to send a message (i.e., record) to a pipe, and receive a message (i.e., record) from a pipe. A pipe is located in shared memory. Shared memory can contain multiple pipes. Each pipe is comprised of a linked list of records, and linked list of sessions, an exclusivity indicator, and a session waiting indicator. Multiple sessions can access the same pipe, and each pipe can contain multiple messages. A message is sent by a sending session to a local buffer. The contents of the local buffer is sent to a pipe. The contents of a pipe, one or more records, can be accessed by getting a record from the pipe and placing it in a local buffer. The contents of the local buffer can be accessed by the requesting session.

26 Claims, 21 Drawing Sheets

2

METHOD AND APPARATUS FOR INTERPROCESS COMMUNICATIONS IN A DATABASE ENVIRONMENT

This application is a continuation of Ser. No. 08/150,592 filed Nov. 10, 1993, now abandoned.

BACKGROUND OF THE INVENTION

1. Field of the Invention

This invention relates to the field of interprocess communication in a database environment.

2. Background Art

A multiprocessing computer system provides the ability for concurrent execution of multiple processes. In some situations, one or more of these processes may have a need to communicate with one another during their execution. This type of communication is referred to as interprocess communication (IPC). For example, a printer control process that controls the output to a printer has a need to communicate with a process that has initiated a print request (e.g., a process executing a word processing application). The two processes must communicate to transmit information concerning the print request (e.g., print request status and print data).

For example, United States Patent No Lippmann describes a multiprocessor system comprising a plurality of data processors that are interconnected by a communication network. Each processor has one or more processes including superprocesses. Each superprocess is provided with a mailbox space for communication with the environment. In the mailbox space, the relevant superprocess and other superprocesses can write to it but only the relevant superprocess can read from it. Each mailbox is provided with a fill indicator. When a read operation is performed in an empty mailbox, a wait signal is issued for the initiating process. When a write operation is performed in a full mailbox space, an error signal is produced. An application load file provides a job control system for allocating jobs among the stations. Thus, the U.S. Pat. No. 4,769,771 (Lippmann) system is directed to a system for communications using mailboxes within each superprocess on a station.

The Unix operating system provide byte-based IPC capabilities using pipes, FIFOs, stream pipes, message queues, semaphores, shared memory, sockets and streams.

A pipe in a Unix system provides the ability for a byte of data to flow in one direction and is used between processes with a common ancestor such as a parent process that creates a child process. FIG. 1A illustrates a pipe. When Parent process 102 executes a function to create a pipe, the pipe function returns two file descriptor values, 104A–104B. File descriptor one (fd[1]) 104B represents the standard output and file descriptor zero (fd[0]) 104A represents the standard input of process 102. Thus, the output from process 102 becomes the input of process 102. This notion that output becomes the input is represented in FIG. 1B as a pipe. Pipe 106 is a half-duplex pipe in that the flow of data occurs in only one direction (i.e., from 104B to 104A). Pipe 106 is terminated when the last process that referencing it terminates.

Typically, a pipe is used to communicate between two processes such that the output of one process becomes the input of another process. As previously indicated, these two processes must be of common ancestry (e.g., a parent that spawns a child process). FIG. 1C illustrates a the situation after parent process 106 creates half-duplex pipe 106, and spawns child process 108. As in FIGS. 1A–1B, the output 104B of parent process 102 is directed to input 104A of parent process 102. Similarly, the output 110B of child process 108 is directed to input 110A of child process 108.

FIG. 1D illustrates pipe 106 after child process 108 closes output 110B, and parent process closes input 104A. This is done to establish a direction of data flow from parent process 102 to child process 108. Thus, the output 104B from parent process 102 will be directed, or piped, to the input 110A of child process 108. Similarly, FIG. 1E illustrates a direction of data flow from child process 108 to parent process 102. The output 110B from child process 108 is directed, or piped, to the input 104A of parent process 102.

Another Unix IPC, FIFO (or named pipes), allows unrelated processes (i.e., not of common ancestry) to communicate. A FIFO is a file used for IPC between processes. Before a FIFO can be used for IPC, it must be created by a process. When it is created, the FIFO is given a name that can be used by unrelated processes to access (i.e., read or write) the FIFO. A FIFO remains until it is explicitly removed, and all of the data in a FIFO is removed when the last referencing process is terminated.

Further, message queues and shared memory provide IPC. Message queues are linked lists of messages stored in the kernel and identified with a message queue identifier. Shared memory allows two or more processes to share a given region of memory. Message queues and shared memory may only contain a single message at any given time. Further, both must be explicitly created, and deleted Each of the techniques previously discussed require an explicit creation of an IPC. There is a need to implement IPC such that there is no need to explicitly create an IPC. Thus, an IPC can be created when a non-existent IPC is initially referenced, and deleted when an IPC is emptied of its information. Further, byte-based Unix IPC requires increased concurrency to obtain the entire message. Thus, it is beneficial to provide an IPC that limits concurrency issues while providing multiple messaging capabilities.

In prior art database management systems (DBMS) that support multiusers and multiprocessing, IPC is performed using the storage and retrieval capabilities of the DBMS. That is, a prior art DBMS, such as a relational database management system (RDBMS) uses a relation (i.e., table) to store and retrieve interprocess messages. Thus, IPC in an RDBMS is accomplished by first inserting the message in a relation, or table, by writing and committing a transaction, and then querying the table to access and retrieve the message. Transaction processing introduces an unnecessary level of complexity both in development and execution of an IPC. Further, transactions processing decreases the speed at which process can communicate.

Thus, the storage and retrieval operations of a DBMS include functionality (e.g., transaction processing and database administration activities) that becomes excess overhead during an IPC. Further, a process that is running in a prior art RDBMS can only communicate with another RDBMS process. Thus, for example, an RDBMS process cannot communicate with an external service (e.g., stock exchange information service).

There is no present ability in prior art DBMS to conduct any of the IPC techniques previously discussed in the Unix context. Further, the Unix techniques require an explicit create, and communicate a byte at a time.

SUMMARY OF THE INVENTION

The present invention provides interprocess communication in a DBMS. The present invention provides the ability for these processes to communicate with other DBMS processes or processes external to the DBMS. A pipe is implemented as an object of the general purpose object cache. The general purpose object cache resides in the systems shared memory space. It is concurrently accessible by many sessions, or processes. A pipe is located in a shared global memory area.

The present invention provides the ability to send a message (i.e., record) to a pipe, and receive a message (i.e., record) from a pipe. A pipe is located in shared memory. Shared memory can contain multiple pipes. Each pipe is comprised of a linked list of records, and linked list of sessions, an exclusivity indicator, and a session waiting indicator. Multiple sessions can access the same pipe, and each pipe can contain multiple messages.

A message is sent by a sending session to a local buffer. The contents of the local buffer is sent to a pipe. The contents of a pipe, one or more records, can be accessed by getting a record from the pipe and placing it in a local buffer. The contents of the local buffer can be accessed by the requesting session.

DETAILED DESCRIPTION OF THE INVENTION

Figure 1A:
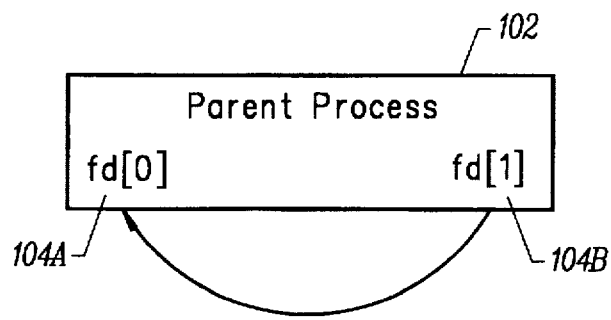
FIGS. 1A–1E illustrates a Unix Pipe.
Figure 1B:
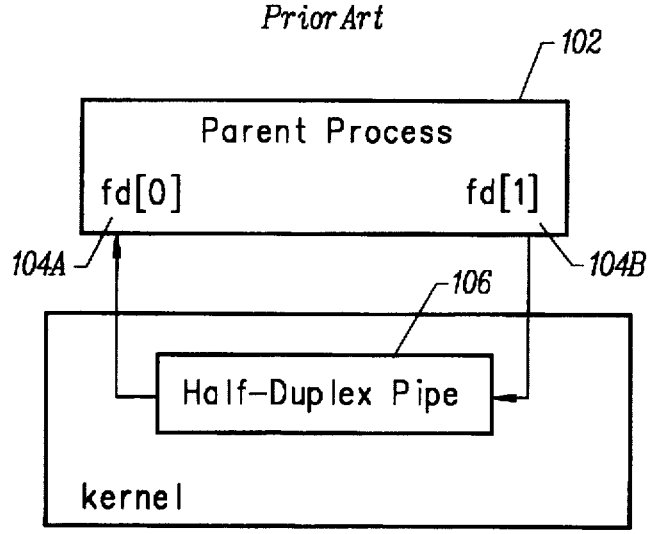
Figure 1C:
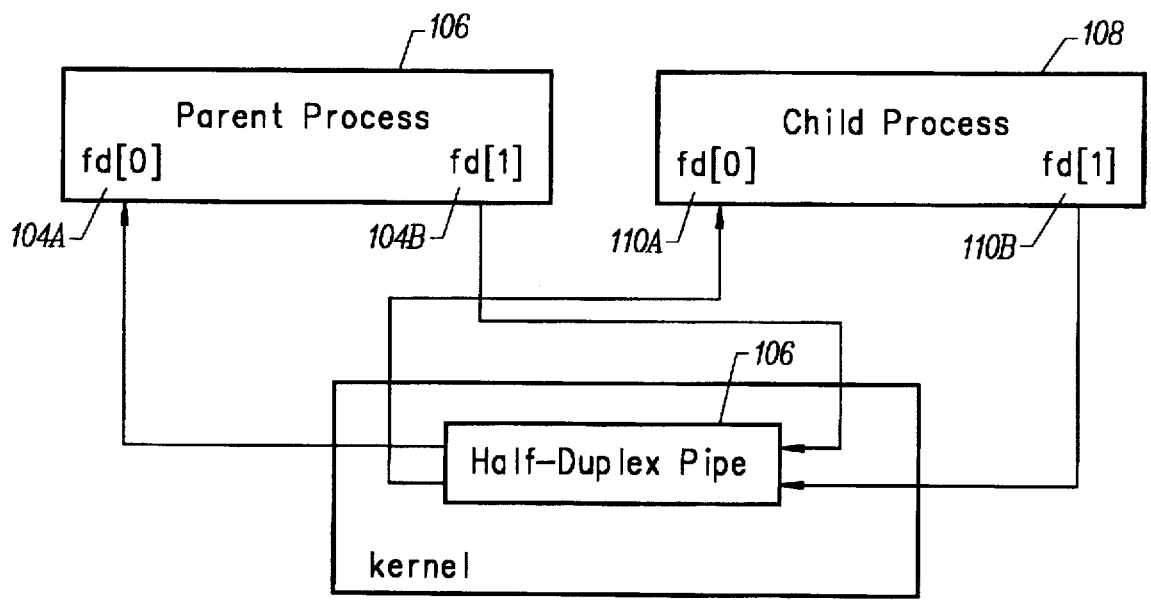
Figure 1D:
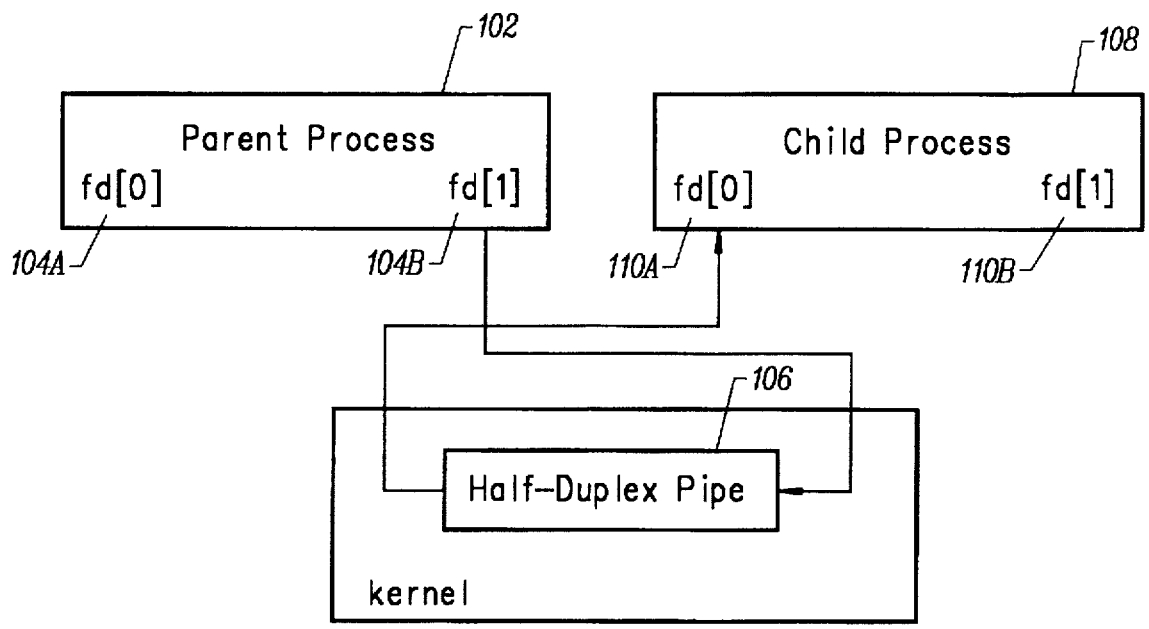
Figure 1E:
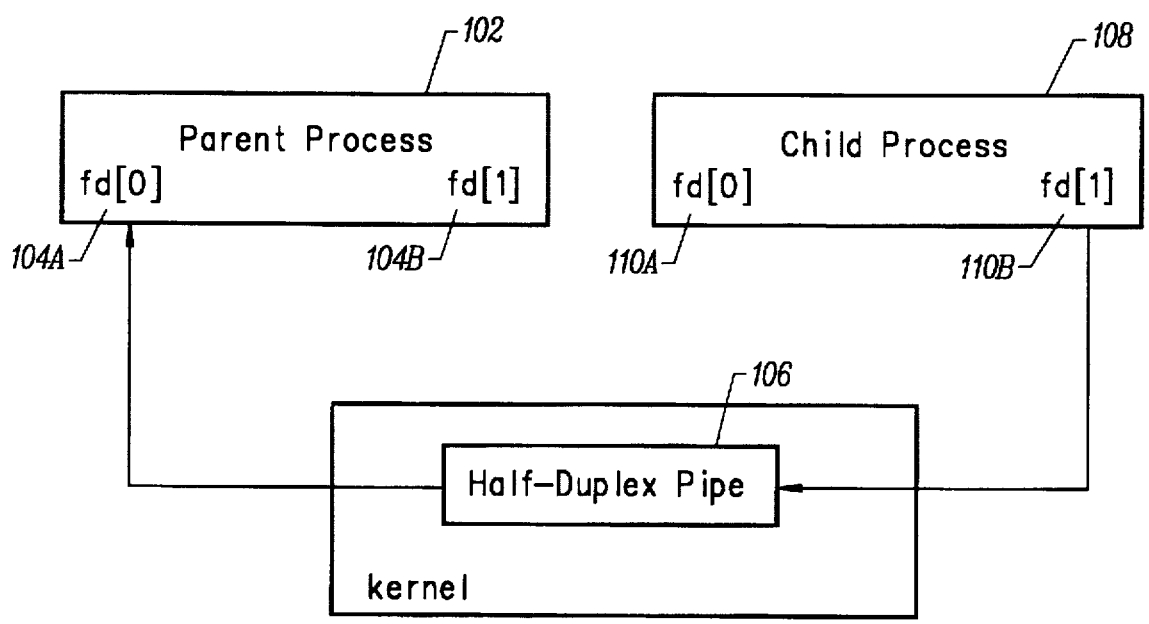

A method and apparatus for providing interprocess communication in a Database Management System is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Processes that execute in a database management system (DBMS) have a need to communicate with other processes via an interprocess communication (IPC) technique (e.g., pipe). The present invention provides the ability for these processes to communicate with other DBMS processes or processes external to the DBMS. The present invention provides a general IPC capability with a DBMS process. The following provides some possible applications for the present invention. The applications are provided for illustrative purposes and are in no way meant to limit the scope of the present invention.

A process performing an operation in a transaction in the DBMS can use the IPC capability of the present invention to communicate with a second process that can perform an operation in a second, independent transaction. Once, the second process commits the independent transaction, it can send a reply message to the first process. Thus, the first process does not have to commit its transaction to get something committed to the database. For example, if the first process detects a security violation (e.g., unauthorized access of a data item) while performing an operation in the first transaction, it can notify the second process of the violation. The second process can execute a transaction to commit the attempted security violation in an exceptions log for later use.

The IPC capabilities of the present invention can be used in a nontransactional operation as an alerter. A first process can post a second, waiting process without requiring the second to poll. For example, a first process is triggered (i.e., initiated) after a database item is changed. One of the operations of this process is to send an IPC message to a second process. Upon receipt of the IPC message, the second process can access the changed item. Thus, since the IPC message alerts the second process to the change, the second process does not have to continuously poll to detect a change.

Many DBMS applications make use of stored procedures or triggers (i.e., procedures that are initiated upon the occurrence of an event). During the development stage, these procedures are usually tested using debugging tools to trace a procedure's execution and generate trace output. Without the present invention, the procedure being tested would have to include logic to write the debugging output to a table, and perform a commit. This affects the logic of the procedure. IPC can be used to send the output to another process that displays the output to the screen or to another output device (e.g., file or printer).

The present invention can act as a concentrator. That is, the present invention can be used to multiplex large numbers of users over a fewer number of network connections. It can also be used to improve performance by concentrating several user transactions into one DBMS transaction. Further, a set of database changes that are to be performed at a remote site can be accumulated, and sent to the remote site as a bundle.

Figure 2A:
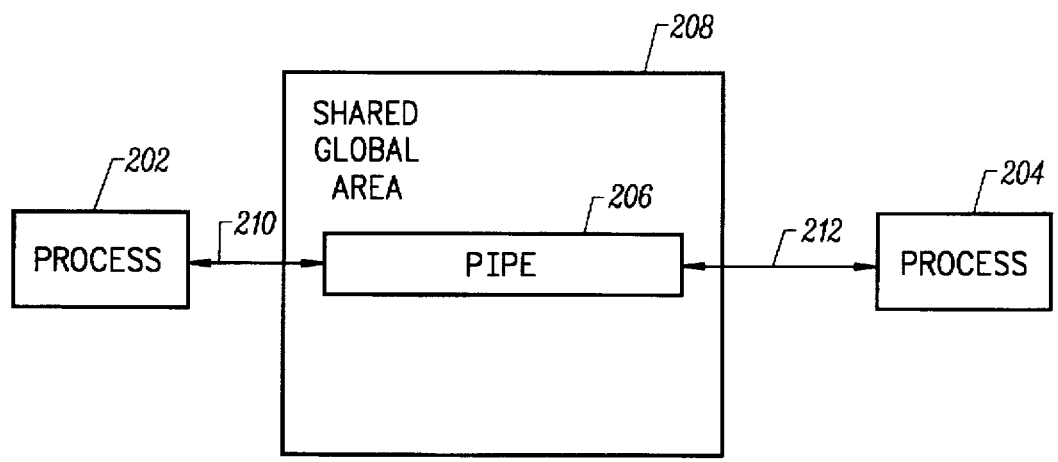
FIG. 2A provides an overview of the IPC provided by the present invention.

A pipe is implemented as an object of the general purpose object cache. The general purpose object cache resides in the systems shared memory space. It is concurrently accessible by many sessions, or processes. FIG. 2A provides an overview of the IPC provided by the present invention. Process 202 and process 204 are able to communicate via pipe 206. Process 202, process 204, or both can be a process executing inside or outside a DBMS. The bi-directional arrows of lines 210 and 212 illustrate that the communication between processes 202 and 204 is bidirectional. That is, both processes 202 and 204 can read or write to pipe 206. Pipe 206 is located in shared global area 208. Shared global area (SGA) 208 is a portion of memory that is accessible by both process 202 and process 204.

Processes (e.g., processes 202 and 204 in FIG. 2A) access SGA 208 using the present invention. These procedures allow data to be sent from one process to SGA 208, and received by another process from SGA 208.

Figure 2B:
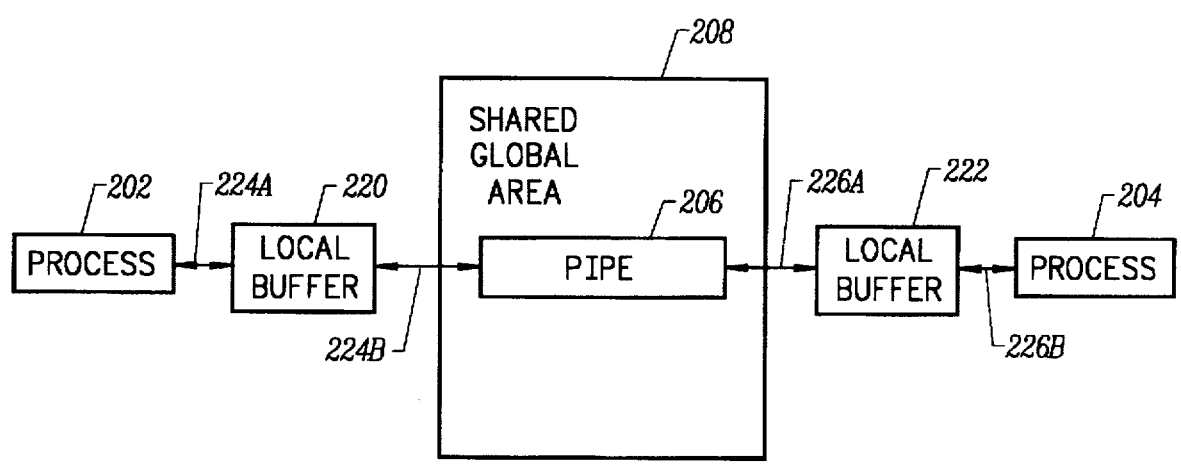
FIG. 2B illustrates a process for sending and receiving that is provided by the present invention.

FIG. 2B illustrates a process for sending and receiving that is provided by the present invention. Local buffers 220 and 222 can be used to buffer IPC messages that are to be sent or are received via pipe 206. To illustrate the process where process 202 sends an IPC message to process 204, process 202 packs a message into local buffer 220 via bidirectional line 224A. Once the message is buffered in local buffer 220, process 202 sends the message to pipe 206 via bidirectional line 224B.

Process 204 receives the message from pipe 206 into local buffer 222 via bi-directional line 226A. Process 204 unpacks the message from local buffer 222 via bidirectional line 226B. In a similar manner, process 204 can send a message that is received by process 202.

Figure 3:
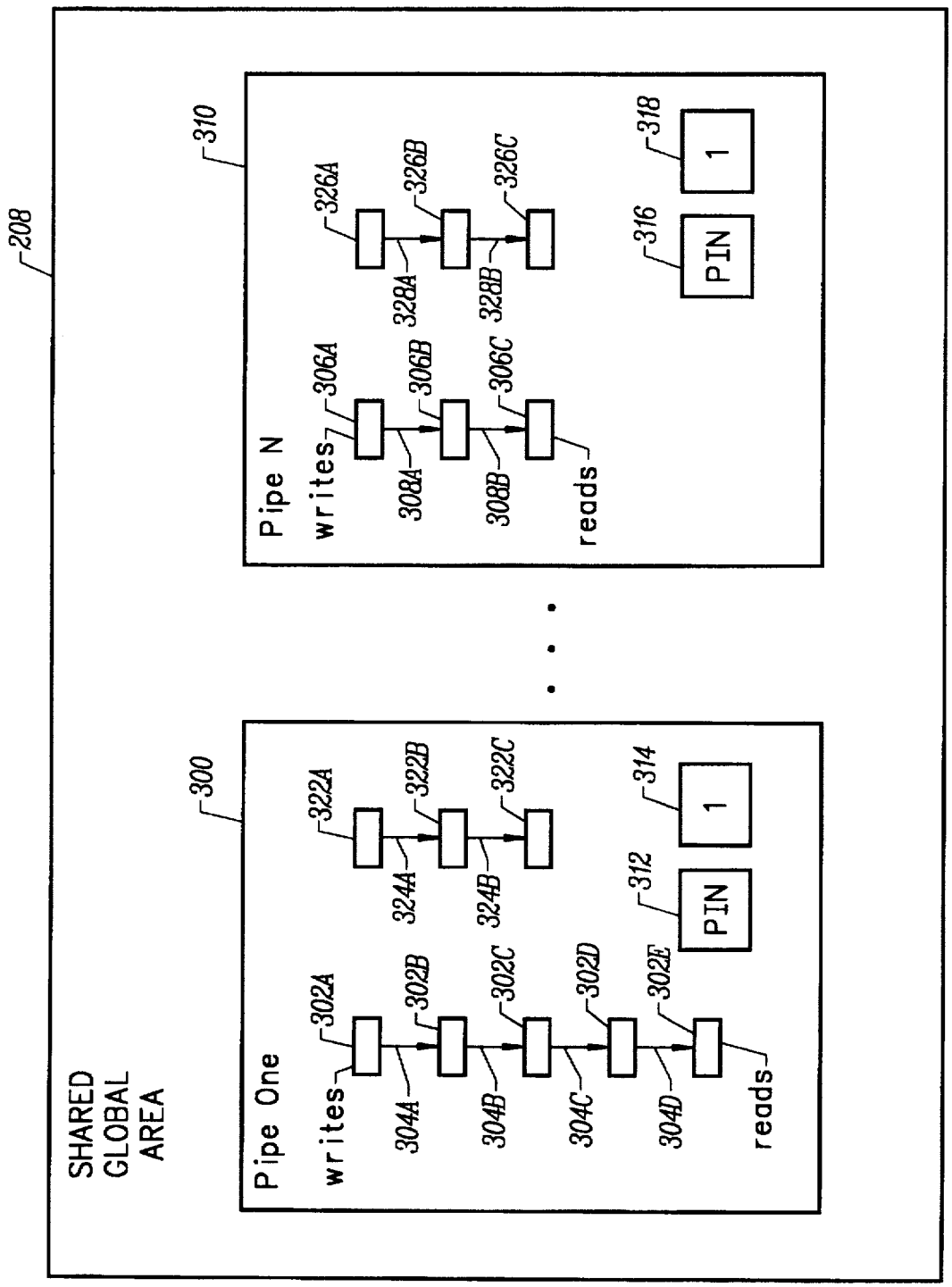
FIG. 3 illustrates shared global area.

SGA 208 can contain multiple pipes. FIG. 3 illustrates SGA 208 with pipe one 300 through pipe N 310. The message capacity of a pipe is based on the size (e.g., 8192 bytes) of the pipes. Thus, a pipe can contain multiple messages up to the capacity of the pipe. The messages in a pipe form a linked list. Messages are read from the end of the list, and written at the front of the list as illustrated with pipe one.

As illustrated in FIG. 3, pipe one currently contains five messages, 302A-302E. Message 302A is linked to message 302B via linkage 304A. Linkages 304B-304D link the remaining messages (i.e., 302B-302E) in the same manner. When a process sends a message to another process via pipe one, the message is written before message 302A. When a process receives a message from another process via pipe one, the message is read from the message 302E up through the last message in the pipe (i.e., message 302A).

A second linked list, a list of sessions is maintained for each pipe. The sessions linked list indicates those sessions waiting for records in the pipe. Pipe One 300 consists of a linked list of sessions 322A-322C that are linked via 324A-324B. Sessions 322A-322C are waiting to access the linked list of records 302A-302E.

Pipe 300 further contains two indicators 312 and 314. Indicator 312 (PIN) specifies the exclusivity of pipe 300. Before modifying a pipe it must be pinned in the cache in exclusive mode to prevent the object from being freed or otherwise accessible during the modification operation. Indicator 314 (I) indicates whether sessions are waiting to access the linked list of records 302A-302E. Similarly, Pipe 310 contains a linked list of records, a linked list of sessions, and PIN and I indicators.

Figure 4:
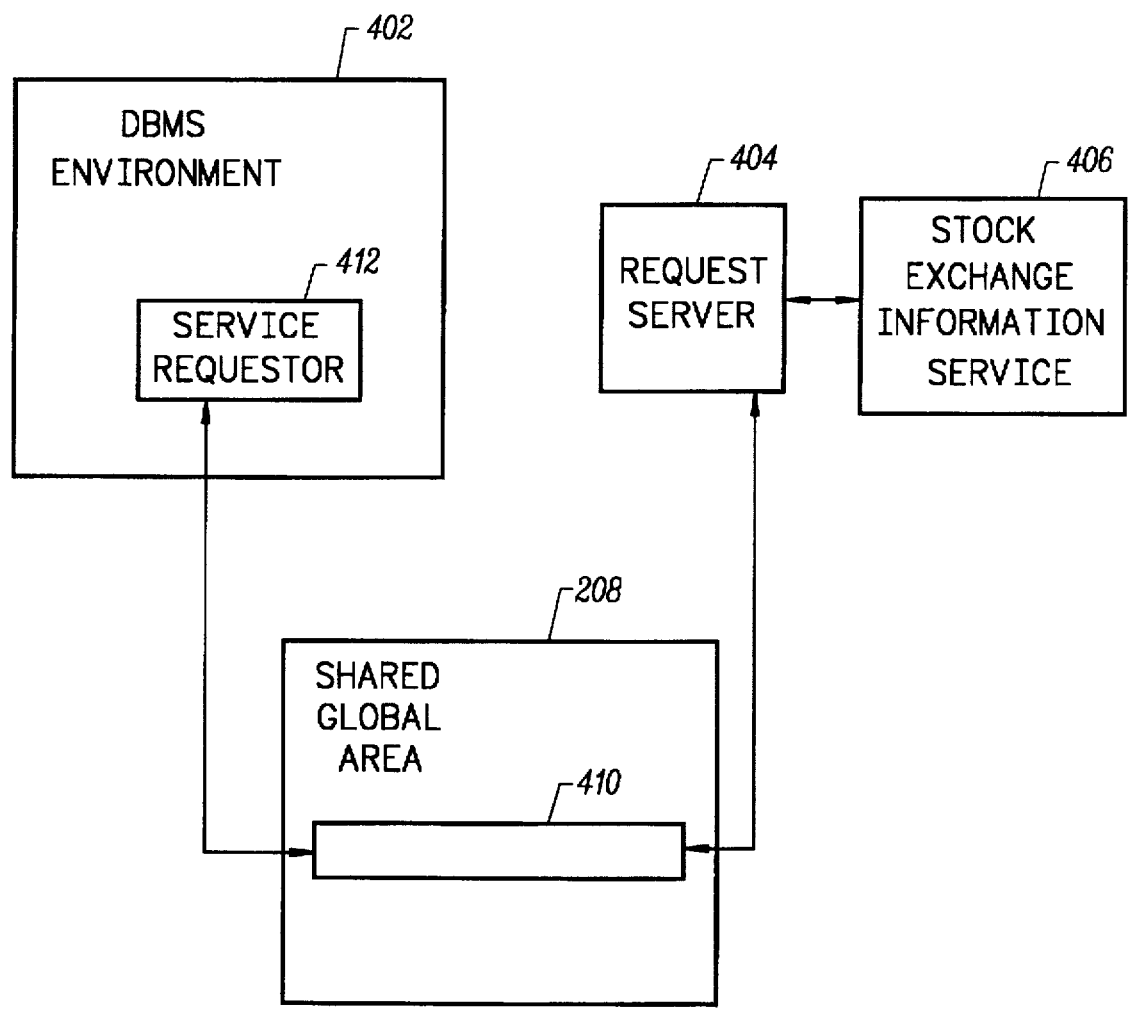
FIG. 4 illustrates a block diagram of a communication path between a DBMS process and an external process.

As previously indicated, the present invention can establish a communication path between a process running in a DBMS environment and a process executing outside a DBMS environment. FIG. 4 illustrates a block diagram of a communication path between a DBMS process and an external process.

Service Requester (Requester) 412 is a process that is executing in DBMS Environment 402. Requester 412 processes stock exchange information that is available from Stock Exchange Information Service (Information Service) 406. To obtain the stock exchange information, Requester 412 sends a request to Request Server (Server) 404. Server 404 processes the request by accessing Information Service 406, and returning the requested information to Requester 412. The request from Requester 412, and the return message from Server 404 are communicated via pipe 410 resident in SGA 208 where requester 412, requestor server 404 and SGA 208 are all in a server environment.

Figure 5A:
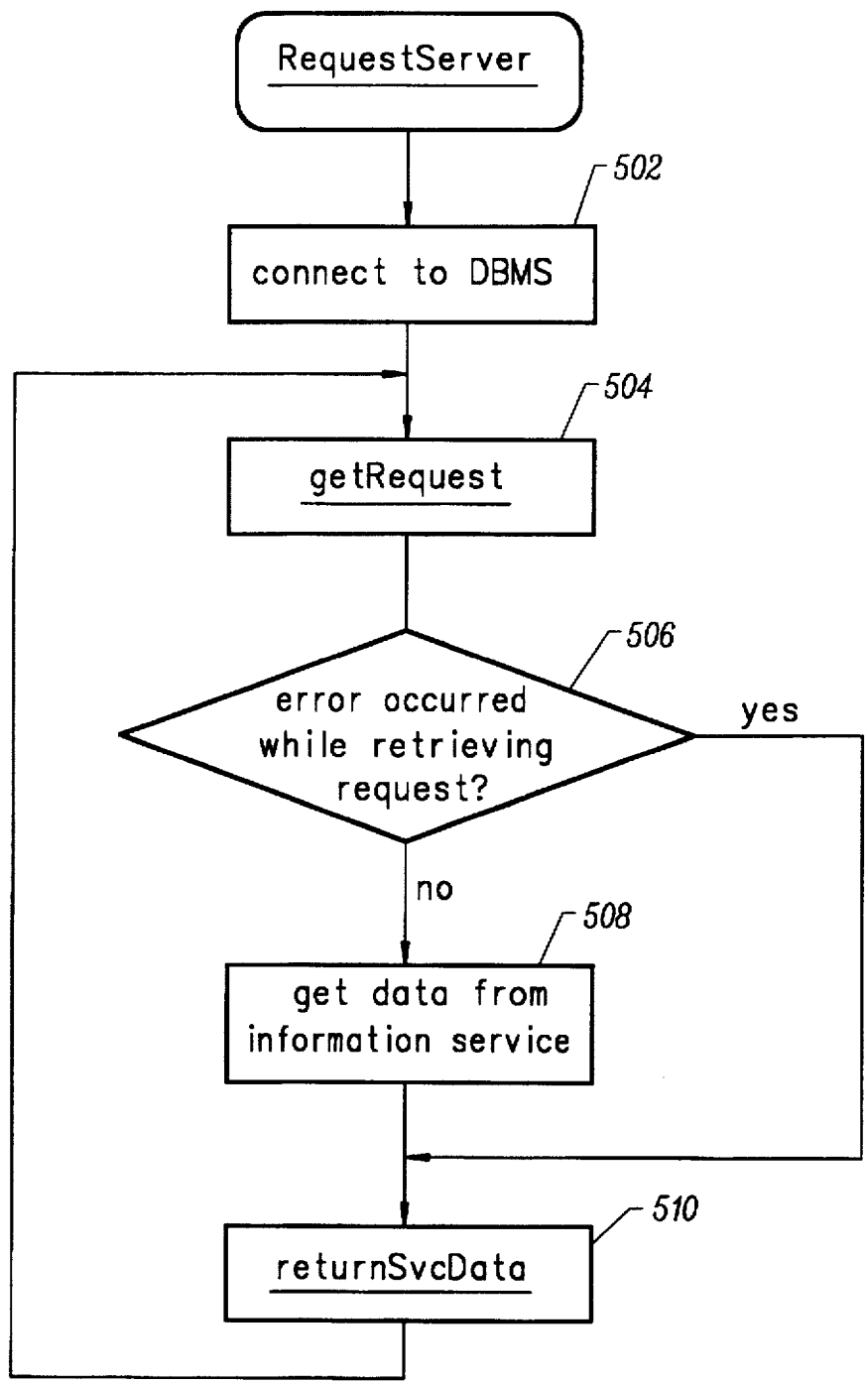
FIG. 5A illustrates a process flow for requestServer.

FIG. 5A illustrates a process flow for Server 404 in FIG. 4. As indicated previously, the procedures that access the place messages in and get messages may be written in a programming language provided by the DBMS. While the present invention provides the ability to access the messages in shared memory without using such a programming language. FIG. 5A illustrates a process flow that assumes such a use. Thus, at process block 502, RequestServer connects to the DBMS before executing the accessing procedures.

At process block 504, getRequest is invoked to obtain a request from a request pipe. At decision block 506 (i.e., "error occurred while retrieving request?"), if an error occurred while retrieving the request, processing continues at processing block 510 to return error message to the requester. If it is determined at decision block 506 that no retrieval error occurred, processing continues at processing block 508.

At processing block 508, RequestServer accesses the information service to retrieve the requested information. For example, if a requester requests stock price information from a stock exchange information service, to satisfy the request, RequestServer formulates the stock price request for the service, accesses the service, and waits for a response from the service. Once a response is received from the service, RequestServer invokes returnSvcData, at processing block 510, to send the response to the requester.

Figure 5B:
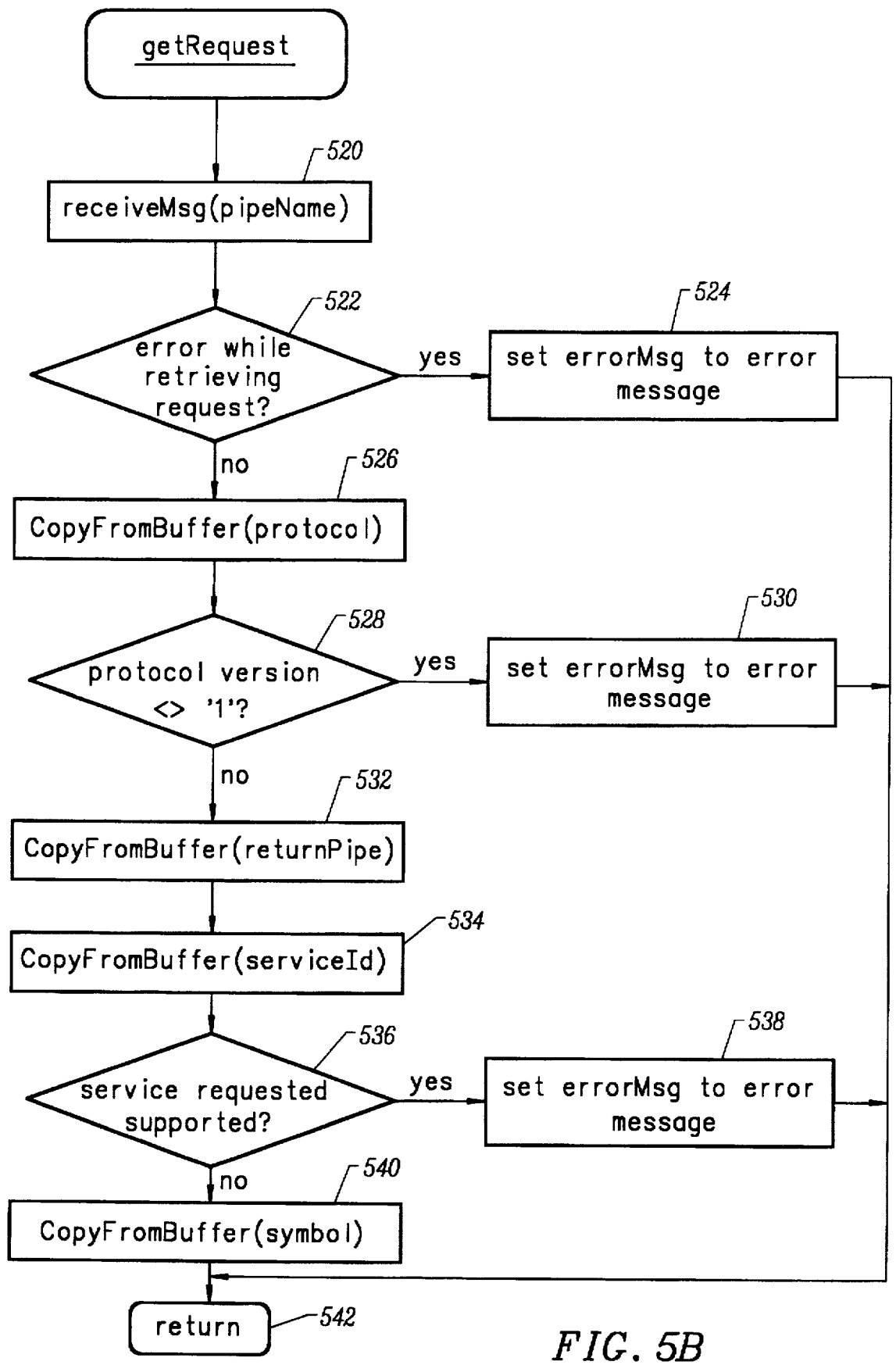
FIG. 5B illustrates a process flow for getRequest.

The getRequest procedure used by the Server process obtains a request from a pipe, unpacks the request, and checks for any processing errors during this process. FIG. 5B illustrates a process flow for getRequest. At processing block 520, receiveMsg is invoked to obtain a request from pipe pipeName. At decision block 522 (i.e., "error while retrieving request?"), if an error is detected during the retrieval, an appropriate error message is generated at processing block 524, and processing returns at 542 (i.e., to requestServer at decision block 506).

If it is determined at decision block 522 that an error did not occur while retrieving the request, processing continues at processing block 526. At processing block 526, CopyFromBuffer is invoked to obtain the protocol field of the message record. At decision block 528 (i.e., "protocol version <>'1'?"), if the protocol is not a valid protocol, an appropriate error message is generated at processing block 530, and processing returns at 542 (i.e., to requestServer at decision block 506).

If it is determined at decision block 528 that a valid protocol was sent, processing continues at processing block 532. At processing block 532, the return pipe designation is obtained from the local buffer. The identification of the service to be accessed to fulfill the request is obtained at processing block 534. At decision block 536 (i.e., "service requested supported?"), if the service identified in the request is not a supported service, an appropriate error message is generated at processing block 538, and processing returns at 542 (i.e., to requestServer at decision block 506).

If it is determined at decision block 536 that a valid service identification has been supplied, processing continues at processing block 540. At processing block 540, the identification of the item for which information is requested is obtained. Processing returns at 542 (i.e., to requestServer at decision block 506).

Figure 5C:
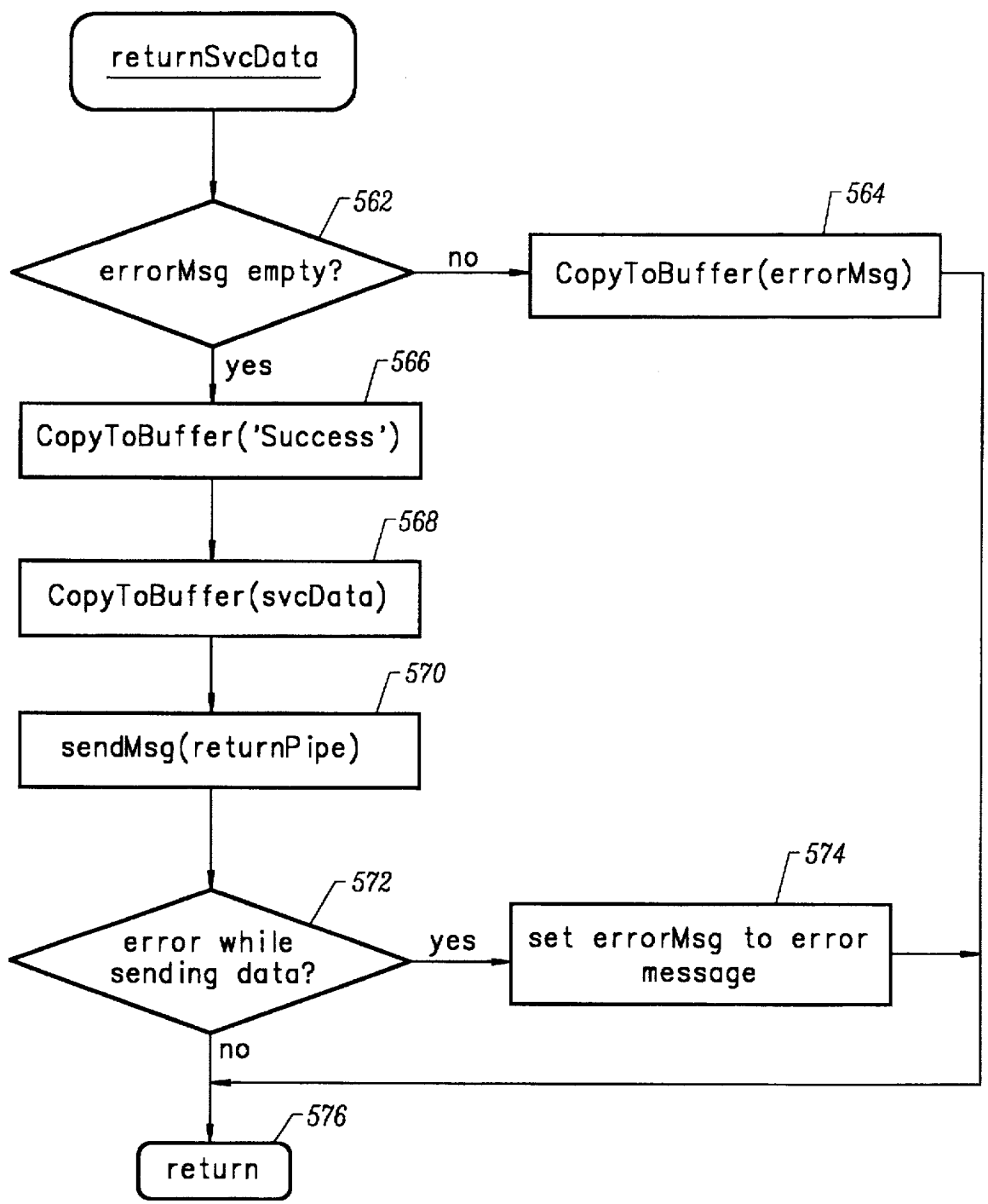
FIG. 5C illustrates a returnSvcData process flow.

After the information service is queried for the information regarding the symbol, or item, designated by the requester, the information is sent back to the requester. FIG. 5C illustrates a process flow to return the information to the requester. At decision block 562 (i.e., "errorMsg empty?"), if an error was detected during the request and information retrievals, processing continues at processing block 564 to place the error message in the local buffer to be sent to the requester. Processing returns at block 576 (i.e., to Request-Server at processing block 510).

If an error was not detected during the request and information retrievals, processing continues at processing block 566. At processing block 566, a success status is stored in the local buffer. At processing block 568, the data received from the information service is stored in the local buffer. The information in the local buffer is sent to the requester on the return pipe at processing block 570. At decision block 572 (i.e., "error while sending data?"), if an error occurred in sending the message, an appropriate error message is generated at processing block 574. The error message can be used by the calling routine to, for example, attempt a resend or provide an alert that the pipe is inoperable. Processing returns at block 576 (i.e., to requestServer at processing block 504).

INTERPROCESS COMMUNICATION FLOW

Figure 6:
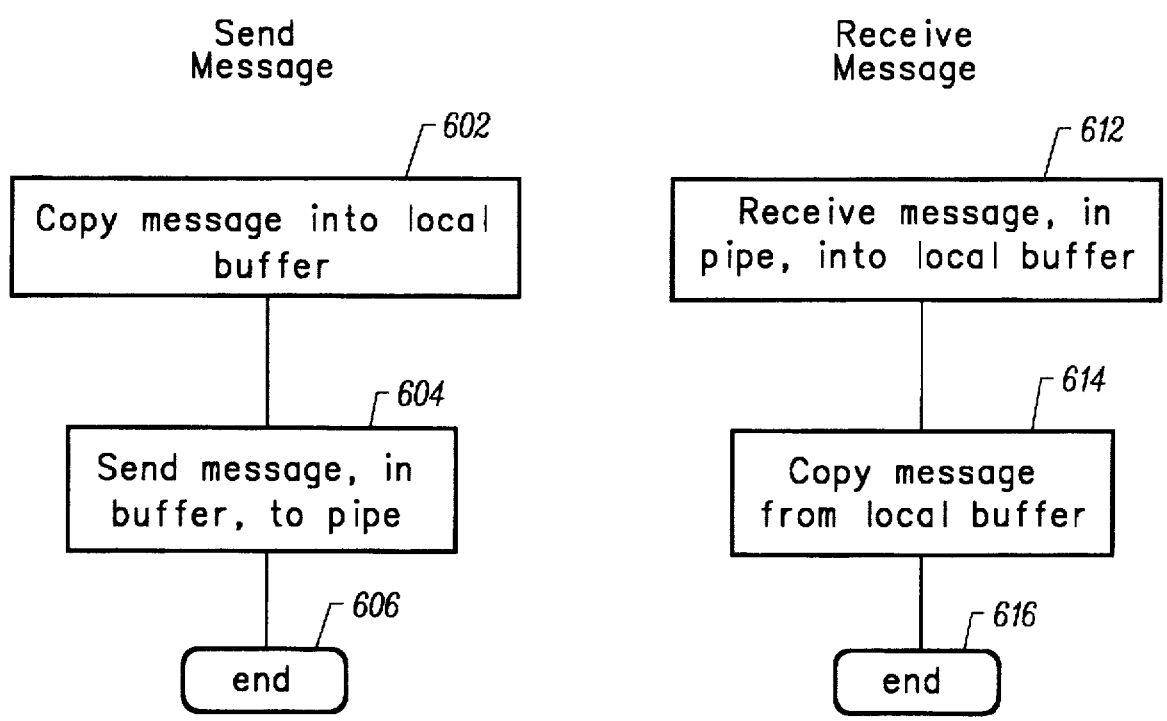
FIG. 6 provides an overview of the Send Message and Receive Message process flows.

The previous example includes the invocation of process flows (i.e., Send Message and Receive Message) for managing the communications between processes. FIG. 6 provides an overview of the Send Message and Receive Message process flows. At block 602, the message to be sent to another process via the pipe is copied into a local buffer. At block 604, the buffered message is sent to the pipe. A message that has been sent to a pipe can be received by a process using the Receive Message process flow. At block 612, the message is pulled from the pipe into a buffer. At block 614, the buffered message can be copied from the buffer by the receiving process.

CopyIntoBuffer

Figure 11A:
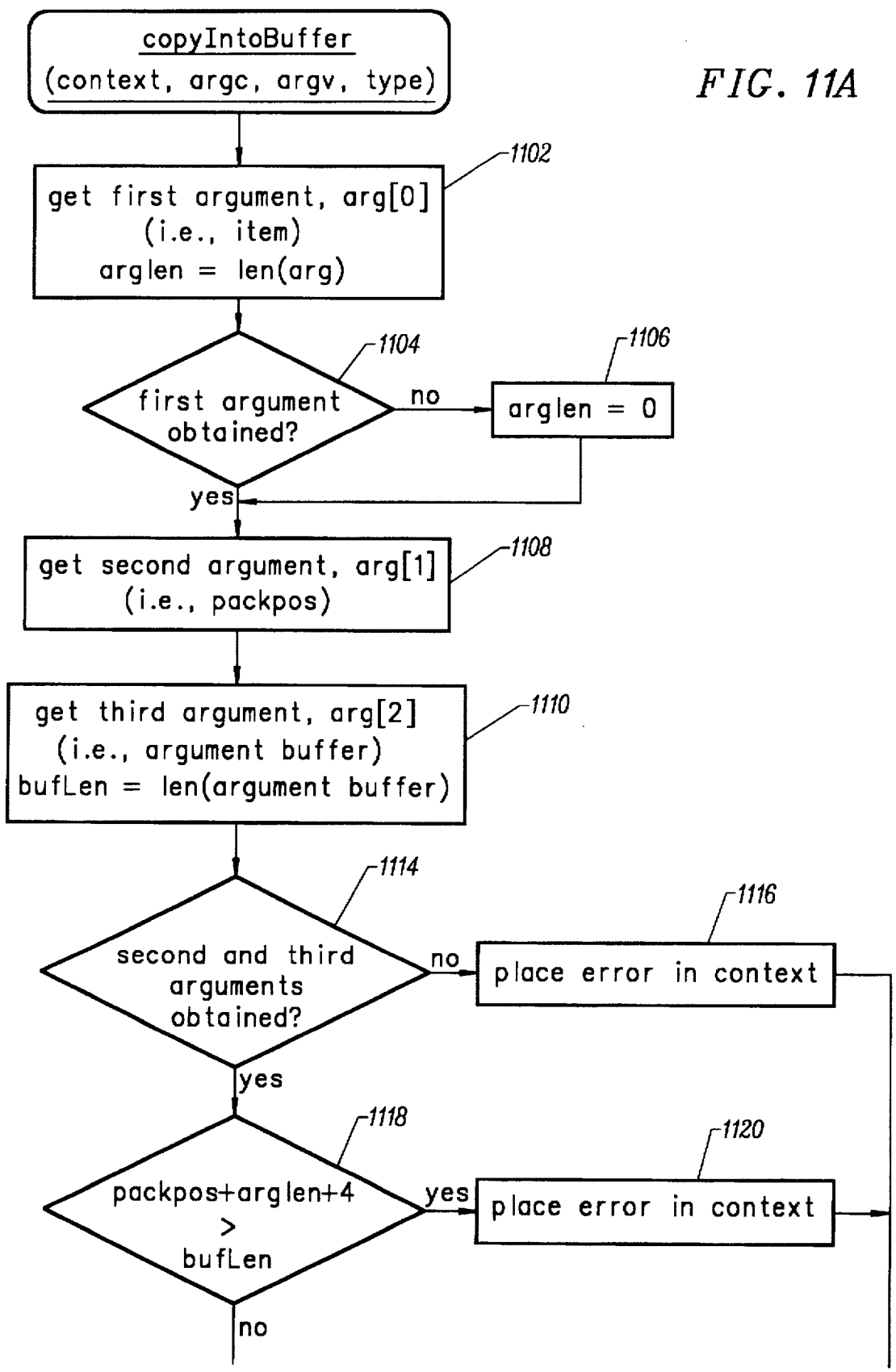
FIG. 11 illustrates a process flow for CopyIntoBuffer.
Figure 11B:
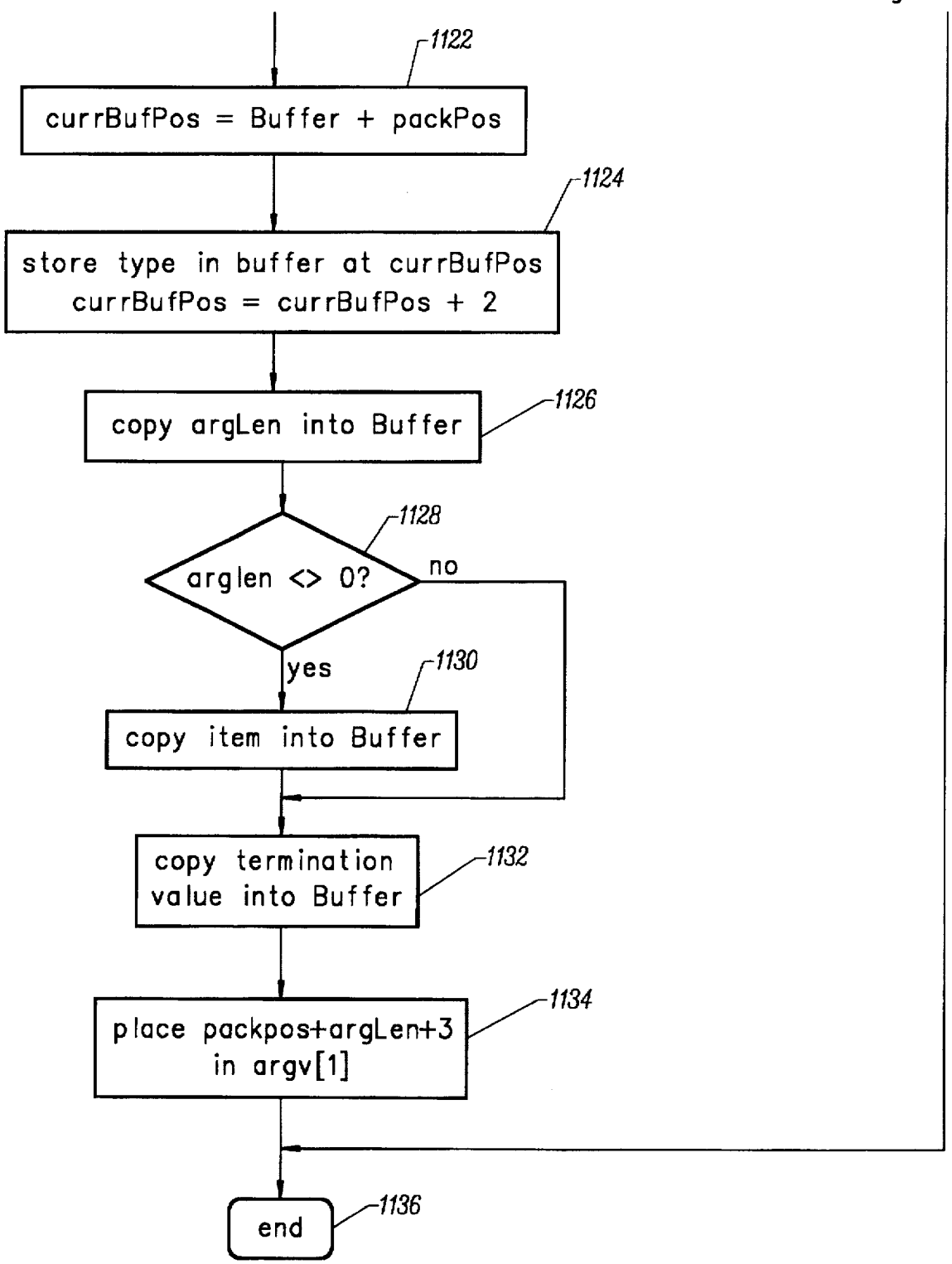

Before a record is transmitted to a pipe, the record is stored in a local buffer. FIG. 11 illustrates a process flow for CopyIntoBuffer. CopyIntoBuffer receives four parameters from the calling program. The first, a context, is used to retain the context of the current invocation. This includes such information as the current state and errors or exceptions. The argc and argv provide the ability to pass additional parameters. Argc indicates the number of additional parameters. Argv contains pointers to the additional parameters. The type indicates the data type of the item to be placed in the buffer.

At block 1102, the first additional argument (i.e., the item to be placed in the buffer) is obtained from argv. The argument's length is stored in a variable (i.e., argLen). At decision block 1104 (i.e., "first argument obtained?"), if the first argument is not available, processing continues at block 1106 to set an argument length, arglen, to zero. Processing continues at block 1108. If the first argument was available, processing continues at block 1108.

At block 1108, the second argument (i.e., the position in the buffer), is obtained. At processing block 1110, the third argument (i.e., the buffer) is obtained, and the length of the argument buffer is determined. At decision block 1114 (i.e., "second and third arguments obtained?"), if the second and third arguments are not available, processing continues to handle the error processing. Error handling can include storing the error in the context argument. Processing ends at block 1136.

If the second and third arguments are available, processing continues at decision block 1118. At decision block 1118 (i.e., "packpos+arglen+4"), if the length of the item (i.e., arglen), type (i.e., one byte), length (i.e., two bytes), and terminator (i.e., one byte) are too large for the buffer, processing continues at block 1120 to handle the error. Processing ends at block 1136.

If the information to be packed into the buffer is not too large, processing continues at processing block 1122. At block 1122, the buffer location for the current information is determined. At processing blocks 1124 and 1126, the data type and argument length are stored into the buffer. At decision block 1128 (i.e., arglen <>0?"), if there is no item to be copied into the buffer, processing continues at processing block 1132.

If there is an item, processing continues at block 1130 to copy the item into the buffer, and processing continues at block 1132. At block 1132, a termination value is stored in the buffer to mark the end of the information currently being packed into the buffer. At block 1134, the context is updated with the first and last positions of the information in the buffer. Processing ends at block 1136.

sendMsg

Figure 7:
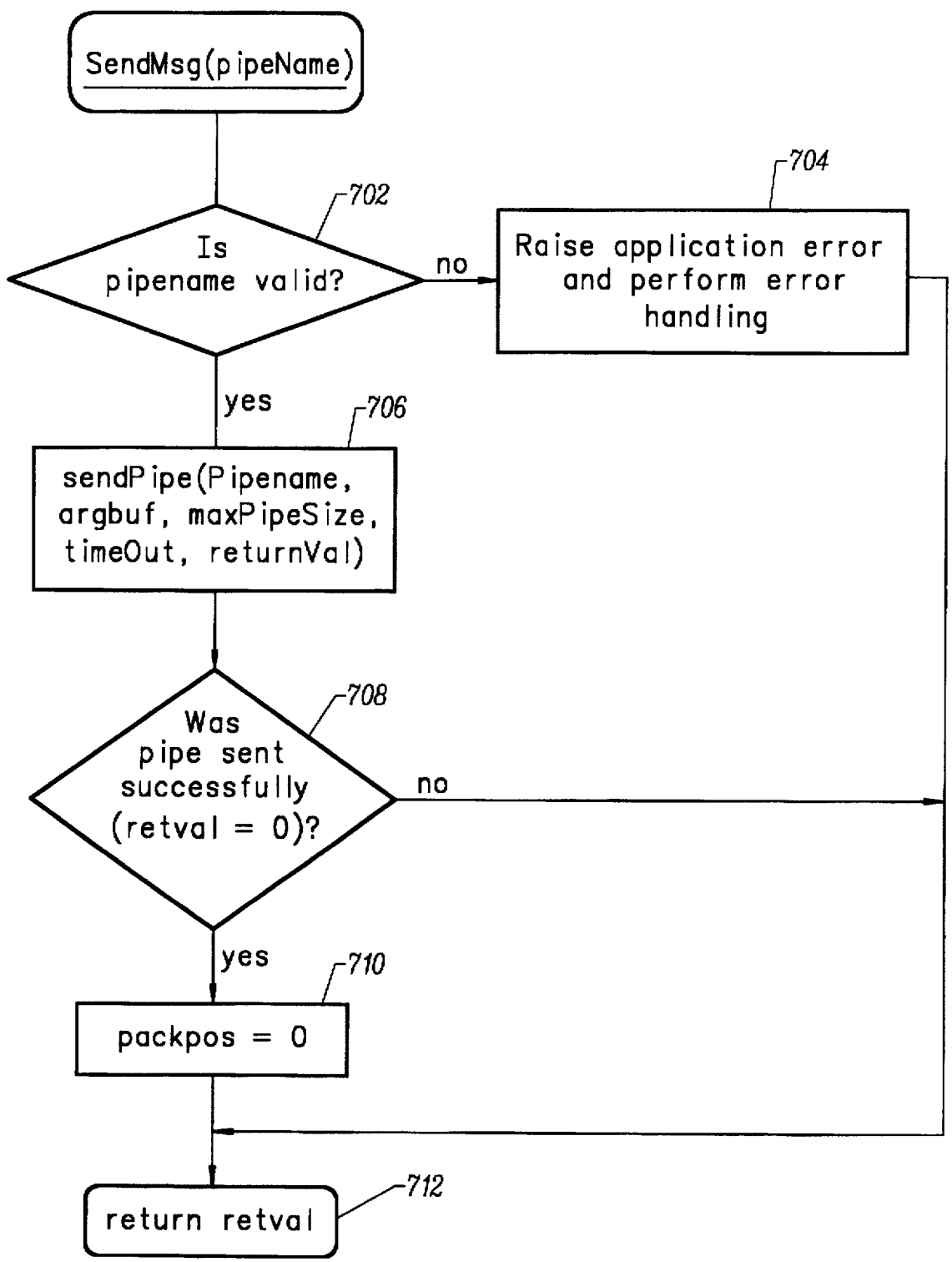
FIG. 7 illustrates a sendMsg process flow.

Once a message has been buffered, the buffered message can be sent to a pipe. FIG. 7, illustrates a sendMsg process flow. At decision block 702 (i.e., "Is pipename valid?"), if the pipename is not a valid name, processing continues at block 704 to raise an application error and perform error handling. Processing returns at block 712.

If, at decision block 702, the pipename is valid, processing continues at block 706 to invoke sendPipe to send message to pipe. At decision block 708 (i.e., "Was pipe sent successfully?"), if the return value from sendPipe indicates that the message was not successfully sent, processing continues returns at block 712. If the message was successfully sent, processing continues at block 710 to set packpos equal to zero. Processing returns at block 712.

sendPipe

Figure 9:
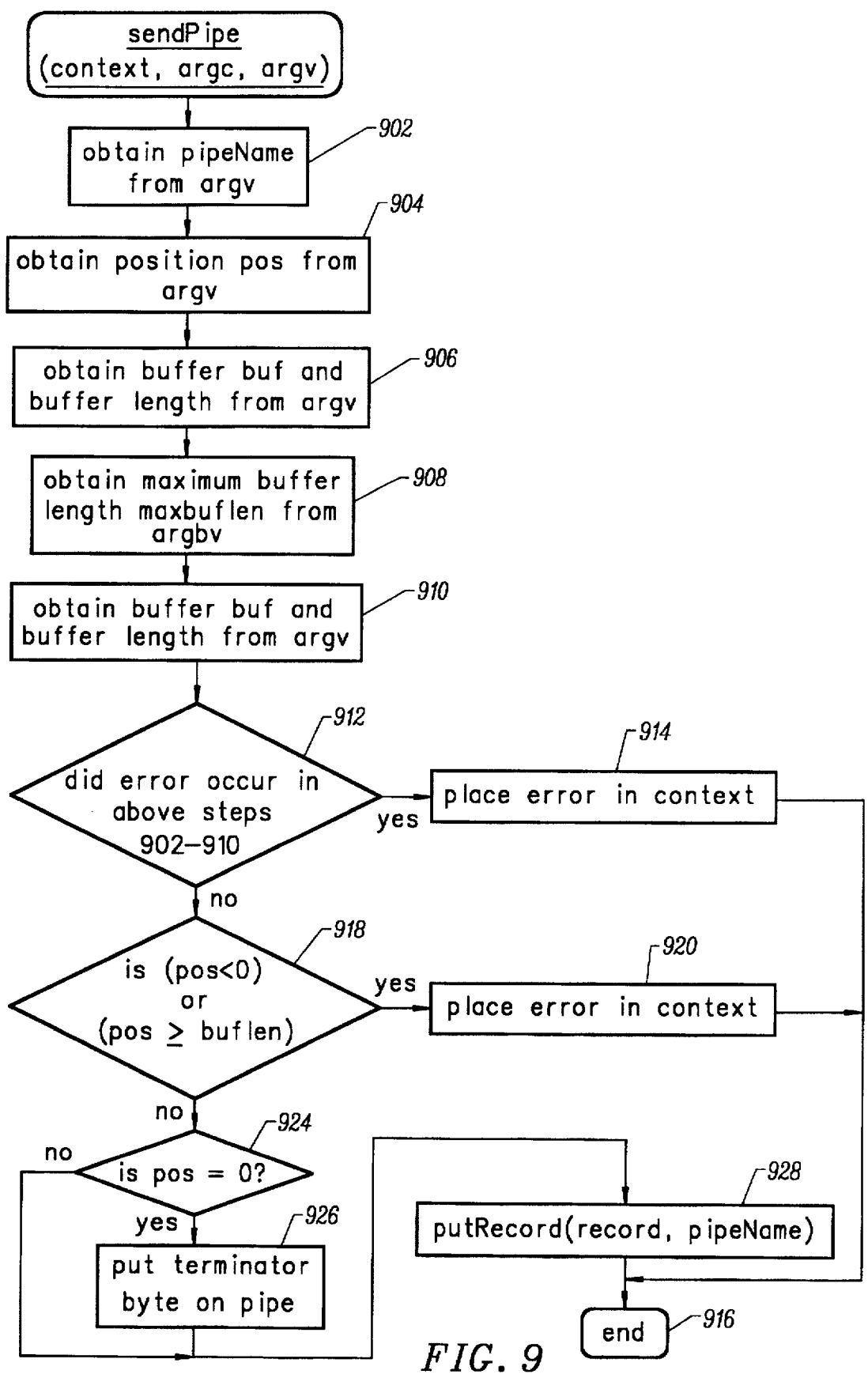
FIG. 9 a flow diagram illustrating a method for putting a buffer into the DBMS pipe according to the present invention.

FIG. 9 is a flow diagram illustrating a method for putting a buffer into the DBMS pipe according to the present invention. The context and arguments argv of the calling PL/SQL command are provided to this method. In step 902, the pipename is obtained from argv. In step 904, the position pos is obtained from argv. In step 906, the buffer buf and buffer length buflen are obtained from argv. In step 908, the maximum buffer length maxbuflen is obtained from argv. In step 910, the timeout value is obtained from argv. In decision block 912, a check is made to determine if any of the steps 902 to 910 failed to obtain the pipename, pos, buf, buflen, maxbuflen, or timeout, respectively. When decision block 912 returns true (yes), the error is handled in step 914, and execution returns to the calling process at step 916. When decision block 912 returns false (no), execution continues at decision block 918.

In decision block 918, a check is made to determine if the position pos is less than zero or it is greater than or equal to the buffer length buflen. When decision block 918 returns true (yes), execution continues at step 920. In step 920, the error is handled, and execution returns to the calling process at block 916. When decision block 918 returns false (no), execution continues at decision block 924. In decision block 924, a check is made to determine if the position in the buffer is equal to 0, thereby indicating an empty record. When decision block 924 returns true, execution continues at step 926. In step 926, a terminator byte (0) is put into buffer buf in position 0. Execution continues at step 928. When decision block 924 returns false (no), execution continues at step 928. In step 928, putrecord is invoked to place the record onto the pipe referenced by pipename. In step 928, a return value is returned and stored in variable retval when the buffer buf is put into the pipe. In step 916, the return value retval (code) indicating the status of step 928 is returned to the calling process.

putRecord

Figure 13A:
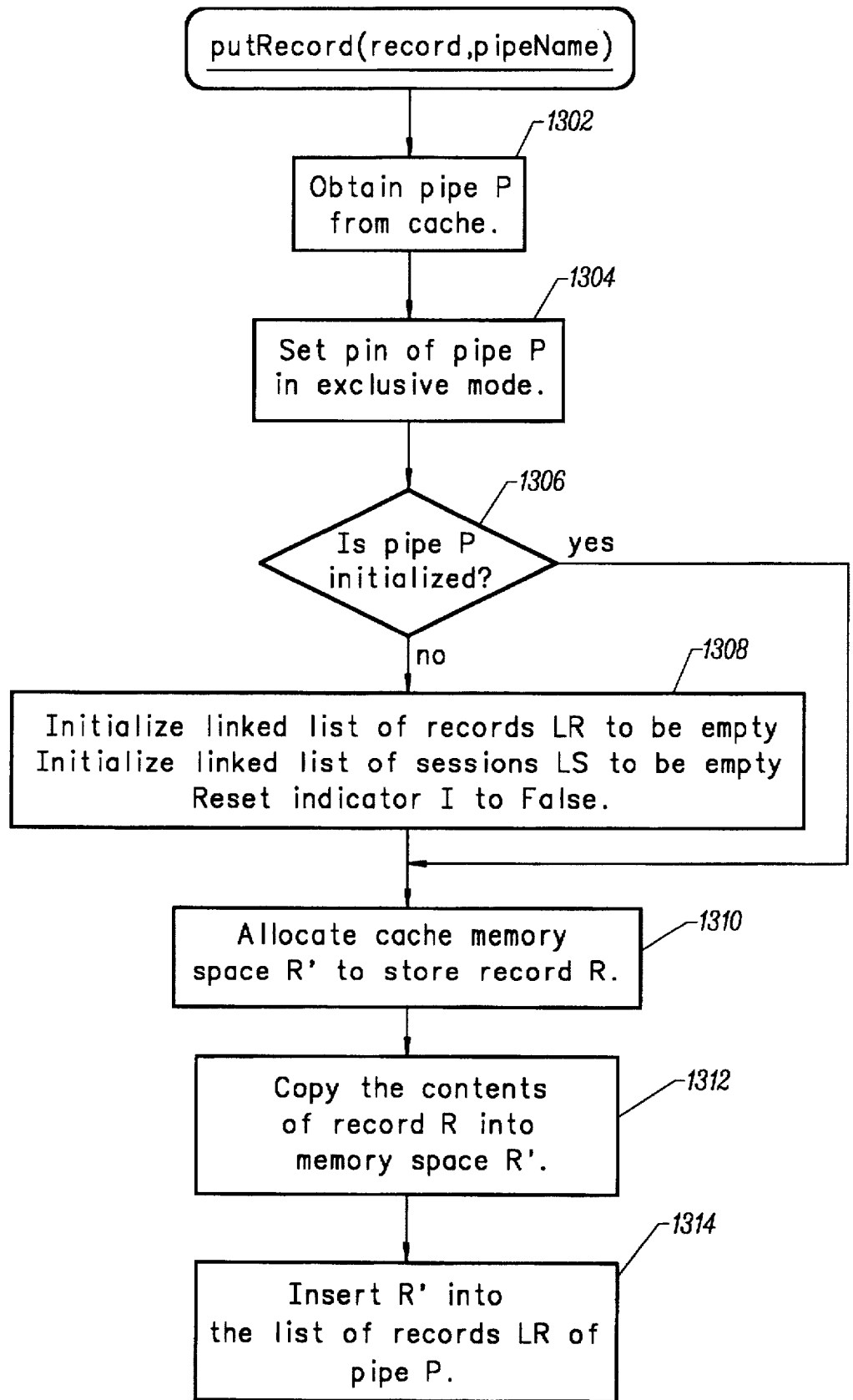
FIG. 13 illustrates putRecord process flow.
Figure 13B:
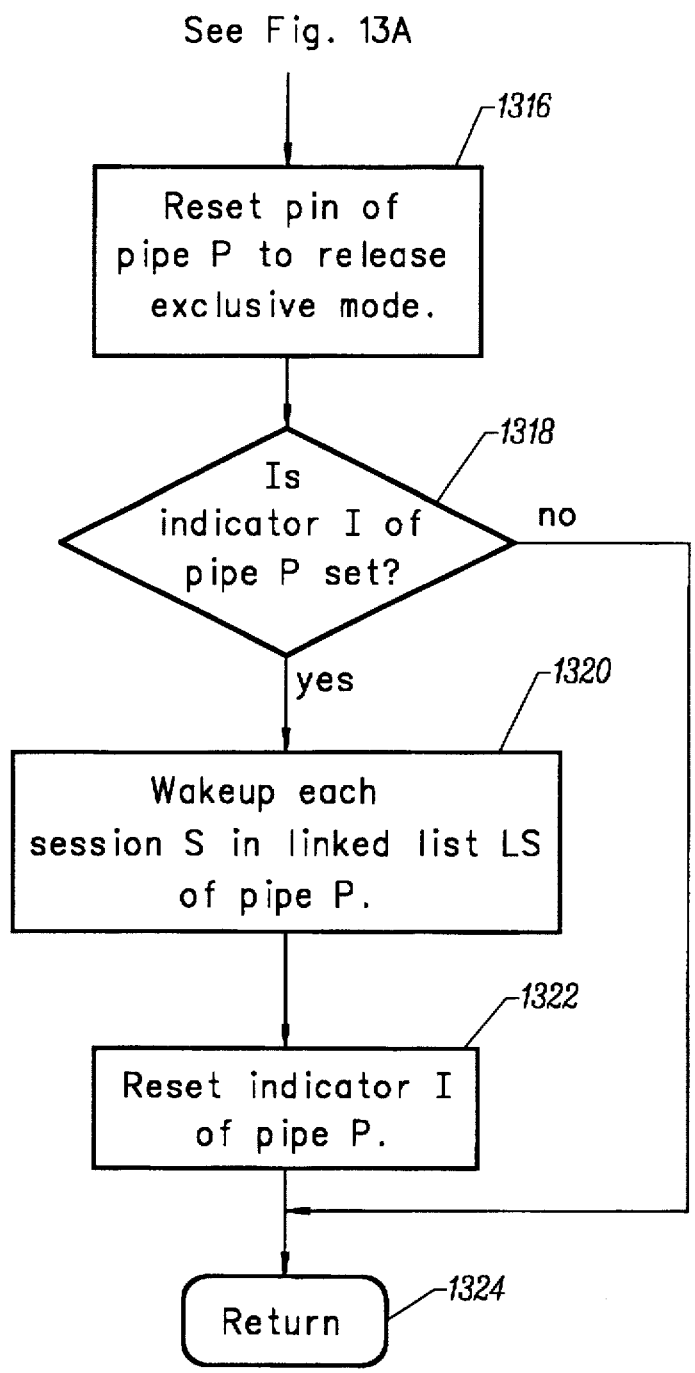

A record from the local buffer is placed onto the pipe, pipeName. FIG. 13 illustrates a putRecord process flow. At block 1302, the pipe, P, is obtained from cache. At block 1304, the pipe is placed in exclusive mode. At decision block 1306 (i.e., "Is pipe P initialized?"), if the pipe does not exist, processing continues at block 1308 to initialize the pipe. The linked list of records, LR, is initialized to empty. The linked list of sessions, LS, is initialized to empty. The "session(s) waiting" flag, I, is set to false. Processing continues at block 1310. If, at decision block 1306, the pipe was initialized, processing continues at block 1310.

At block 1310, cache memory space is allocated for a new record. At block 1312, the record is copied into the cache record. At block 1314, the cache record is inserted into the list of records, LR for the pipe. At block 1316, the pipe's PIN is reset to release exclusive mode. At decision block 1318 (i.e., "Is indicator I of pipe P set?"), if there are no sessions waiting for a record, processing returns at 1324. If there are sessions waiting, processing continues at block 1320 to awake each session S in linked list, LS, for pipe P. The "session waiting" indicator is reset at block 1322. Processing returns at block 1324.

receiveMsg

Figure 8:
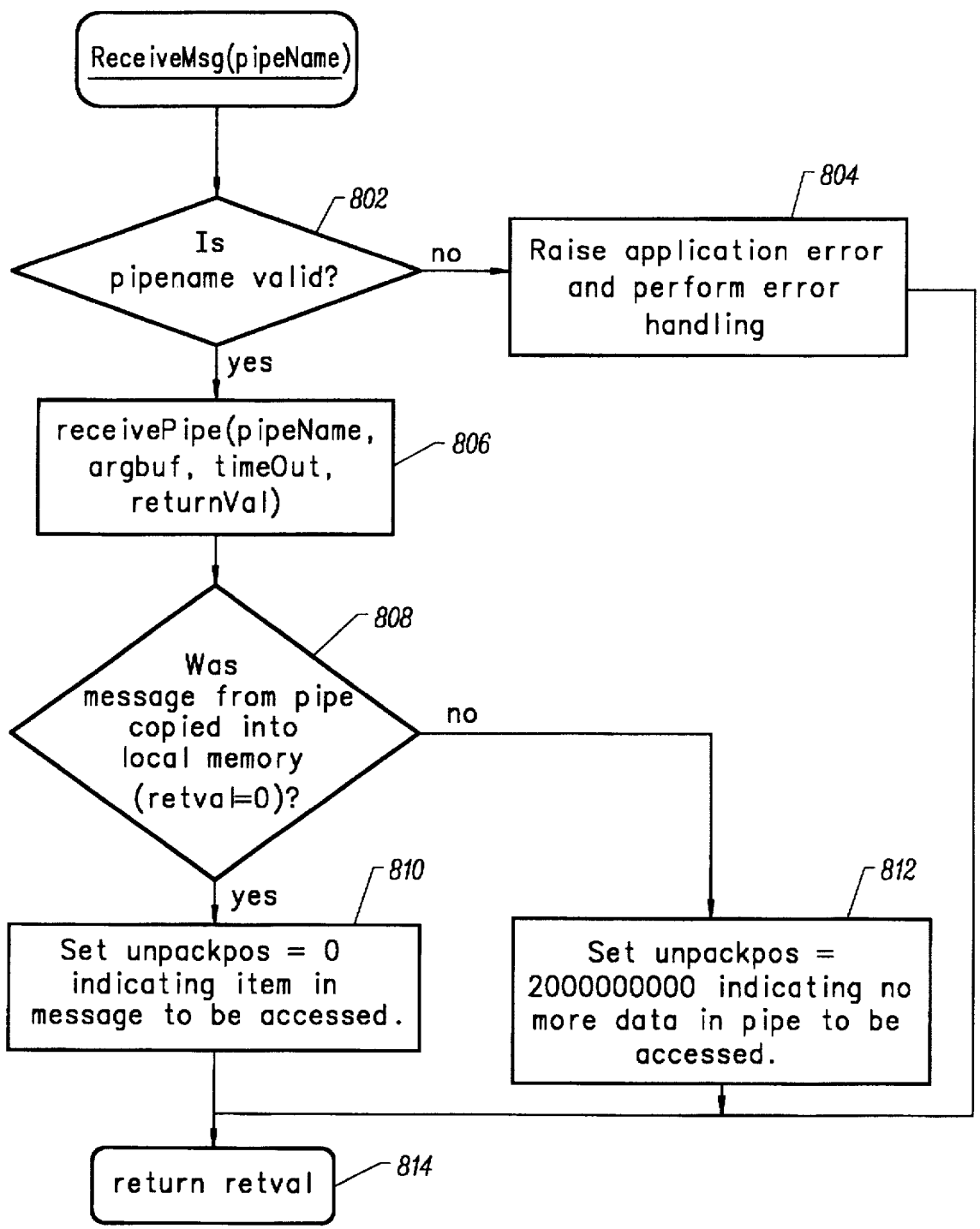
FIG. 8 illustrates a receiveMsg process flow.

When a process needs to retrieve a message (i.e., record) from a pipe, the process can invoke receiveMsg. FIG. 8 illustrates a receiveMsg process flow. At decision block 802 (i.e., "Is pipename valid?"), if pipename is not valid, processing continues at block 804 to raise an application error and process the error. Processing returns at block 814. If, at decision block 802, the pipename is valid, processing continues at block 806.

At processing block 806, receivePipe is invoked to pull a record from a pipe. At decision block 808 (i.e., "Was message from pipe copied into local memory?"), if a message (i.e., record) was copied from a pipe into a buffer, processing continues at block 810 to set unpackpos to a value indicating the item in the message to access. If a message was not copied from a pipe, processing continues at block 812 to set unpackpos to a value indicating that there is no more data in pipe to access. In either case, processing returns at block 814.

receivePipe

Figure 10:
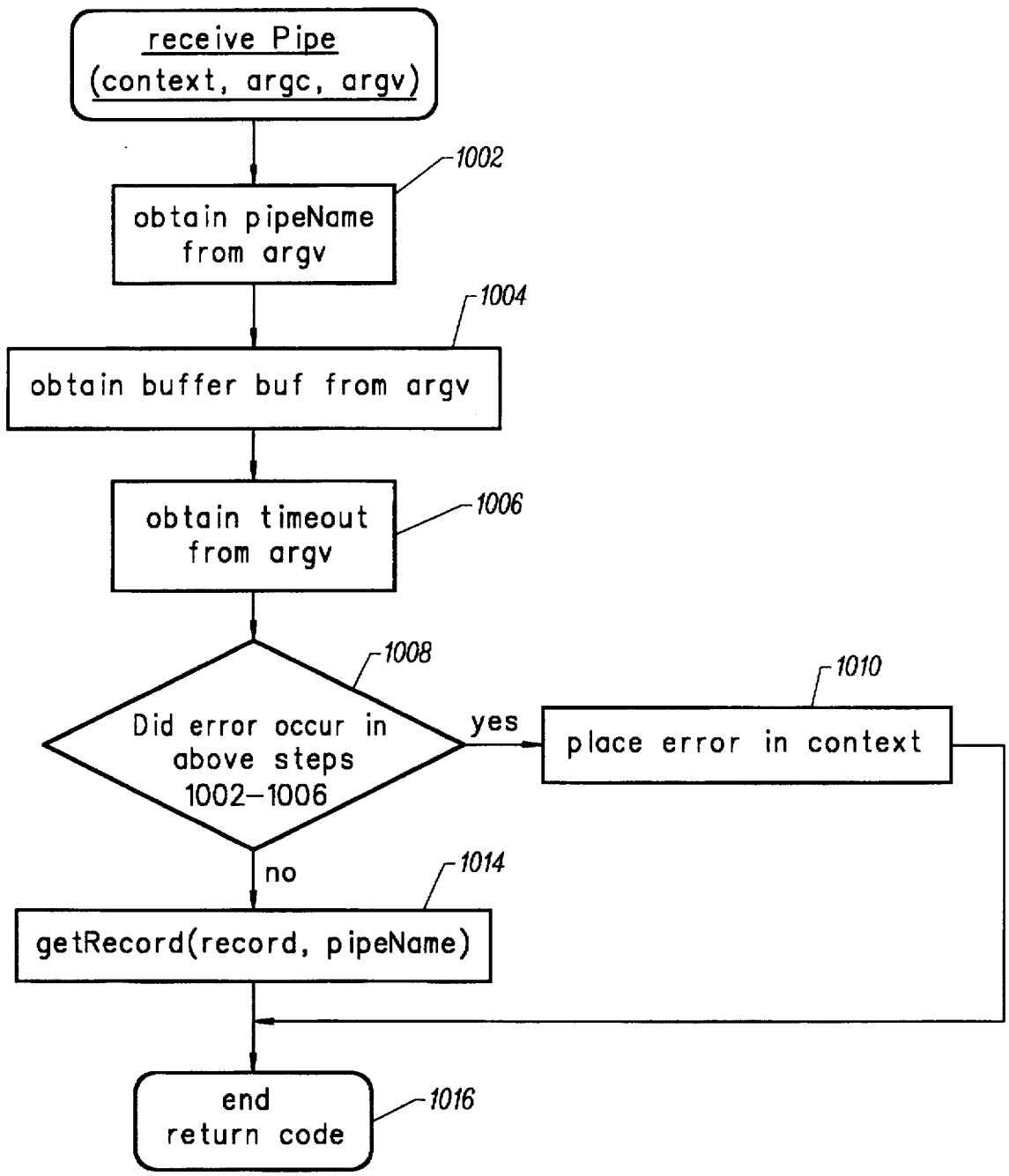
FIG. 10 is a flow diagram illustrating a method for getting a buffer from the DBMS pipe according to the present invention.

FIG. 10 is a flow diagram illustrating a method for getting a buffer from the DBMS pipe according to the present invention. The context and arguments argv of the calling PL/SQL command are provided to this method. In step 1002, the pipename is obtained from argv. In step 1004, the buffer buf and buffer length buflen are obtained from argv. In step 1006, the timeout value is obtained from argv. In decision block 1008, a check is made to determine if any of the steps 1002 to 1006 failed to obtain the pipename, buf, buflen, or timeout, respectively. When decision block 1008 returns true (yes), the error is handled in step 1010, and execution returns to the calling process at block 1016. When decision block 1008 returns false (no), execution continues at step 1014. In step 1014, getRecord is invoked to get a record from the pipe referenced by pipename. In step 1014, a return value is returned and stored in variable retval when the buffer buf is obtained from the pipe. In step 1016, the return value retval (code) indicating the status of step 1014 is returned to the calling process.

getRecord

Figure 14A:
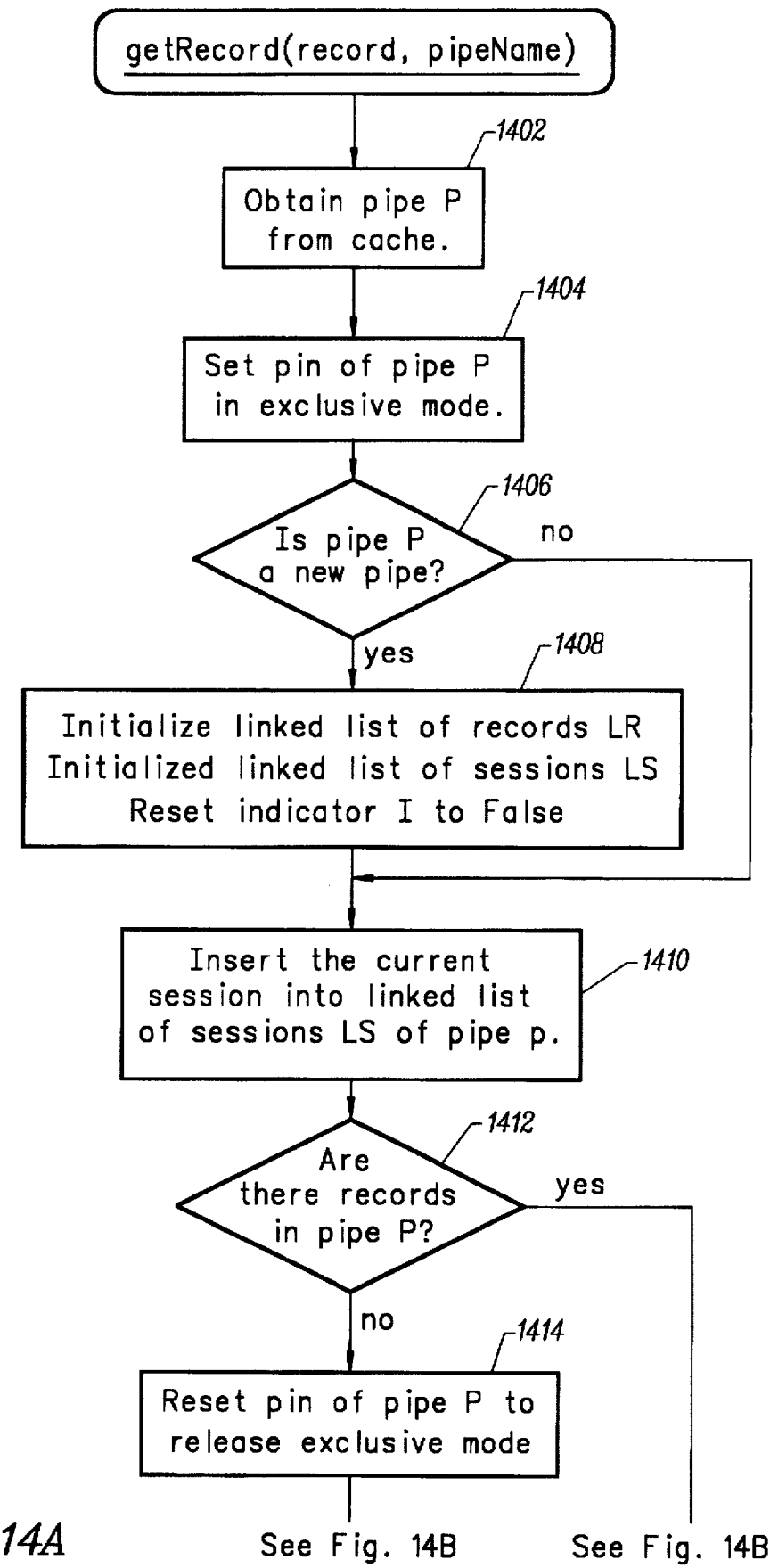
FIG. 14 illustrates a getRecord process flow.
Figure 14B:
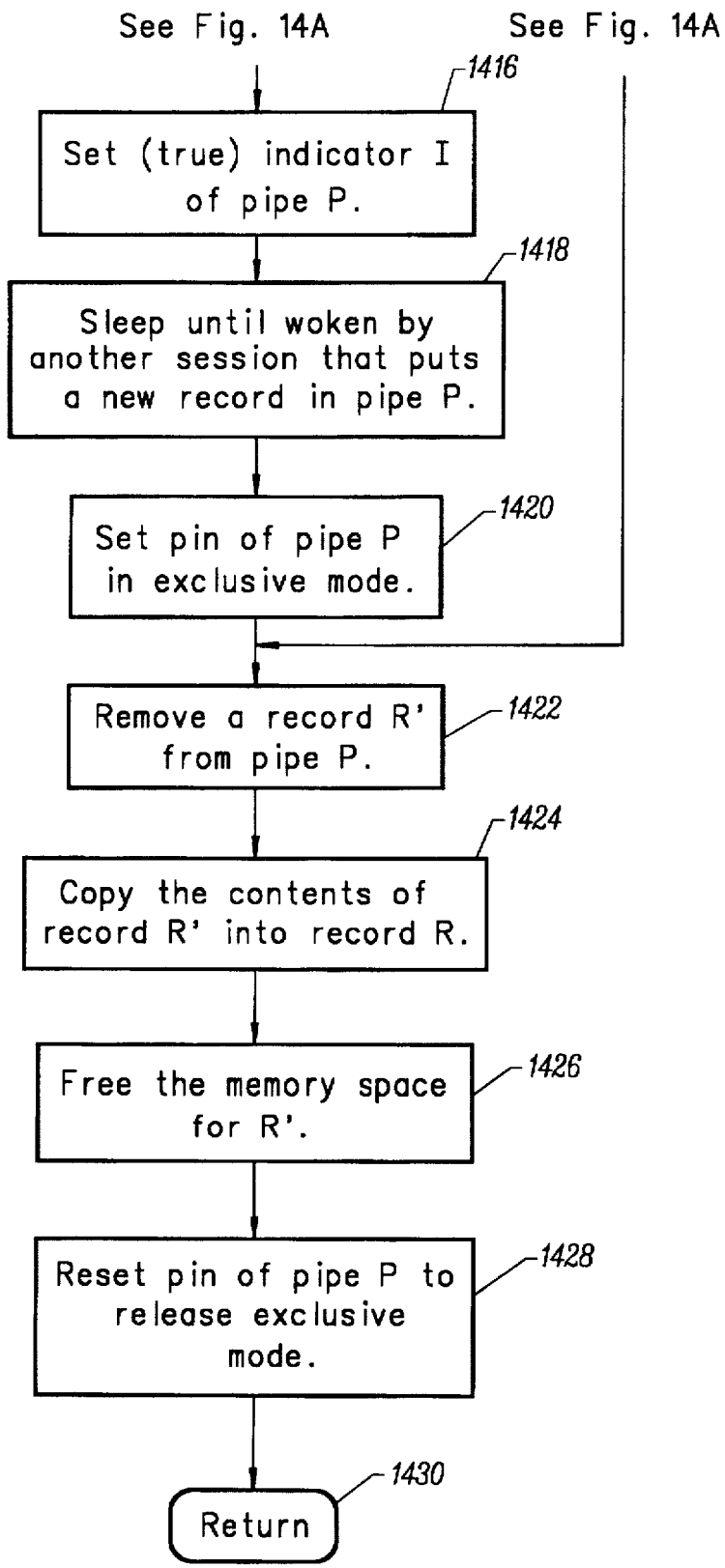

A record is obtained from a pipe, P, to be placed in a local buffer using getRecord. FIG. 14 illustrates a getRecord process flow. At block 1402, the pipe, P, is obtained from cache. At block 1404, the pipe is placed in exclusive mode. At decision block 1406 (i.e., "Is pipe P initialized?"), if the pipe does not exist, processing continues at block 1408 to initialize the pipe. The linked list of records, LR, is initialized to empty. The linked list of sessions, LS, is initialized to empty. The "session(s) waiting" flag, I, is set to false. Processing continues at block 1410. If, at decision block 1406, the pipe was initialized, processing continues at block 1410.

At block 1410, the current session (i.e., the session requesting a record from the pipe) is inserted in the linked list of sessions, LS, for the pipe. At decision block 1412 (i.e., "Are there records in pipe P?"), if there are records in the pipe, processing continues at block 1422. If there are no records in the pipe, processing continues at block 1414 to reset the pipe's PIN to release exclusive mode.

At block 1416, the "session(s) waiting" flag is set to true. At block 1418, the requesting session is put to sleep until a record is placed in the pipe. At block 1420, when a record is added to the pipe, the pipe is placed in exclusive mode, and processing continues at block 1422. At blocks 1422 and 1424, a record is removed from the pipe. At block 1426, the memory cache used for the record in the pipe is examined to determine whether it contains any records, and, if empty, the region is freed or released. At block 1428, the pipe is removed from exclusive mode. Processing returns at block 1430.

CopyFromBuffer

Figure 12A:
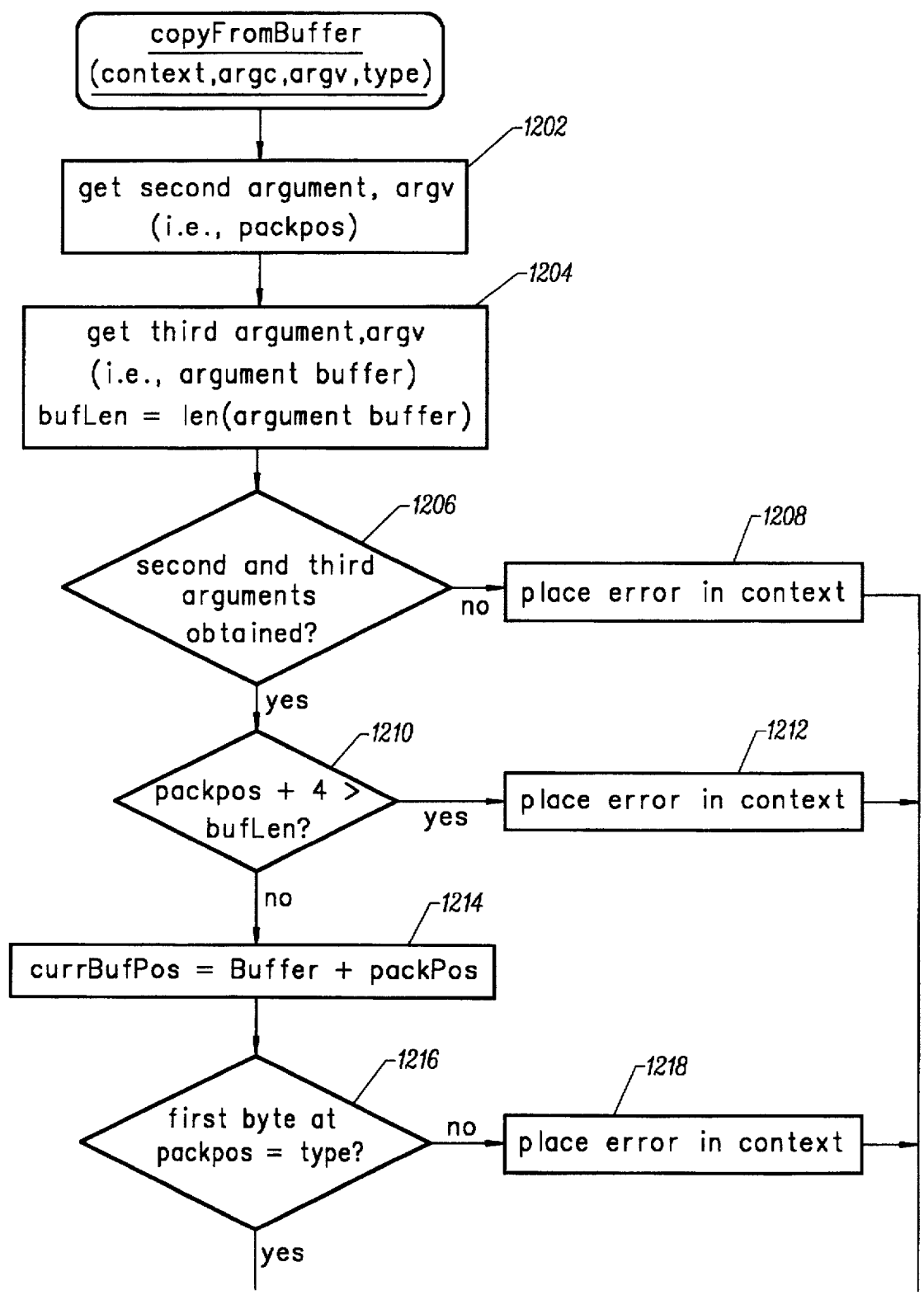
FIG. 12 illustrates a process flow for CopyFromBuffer.
Figure 12B:
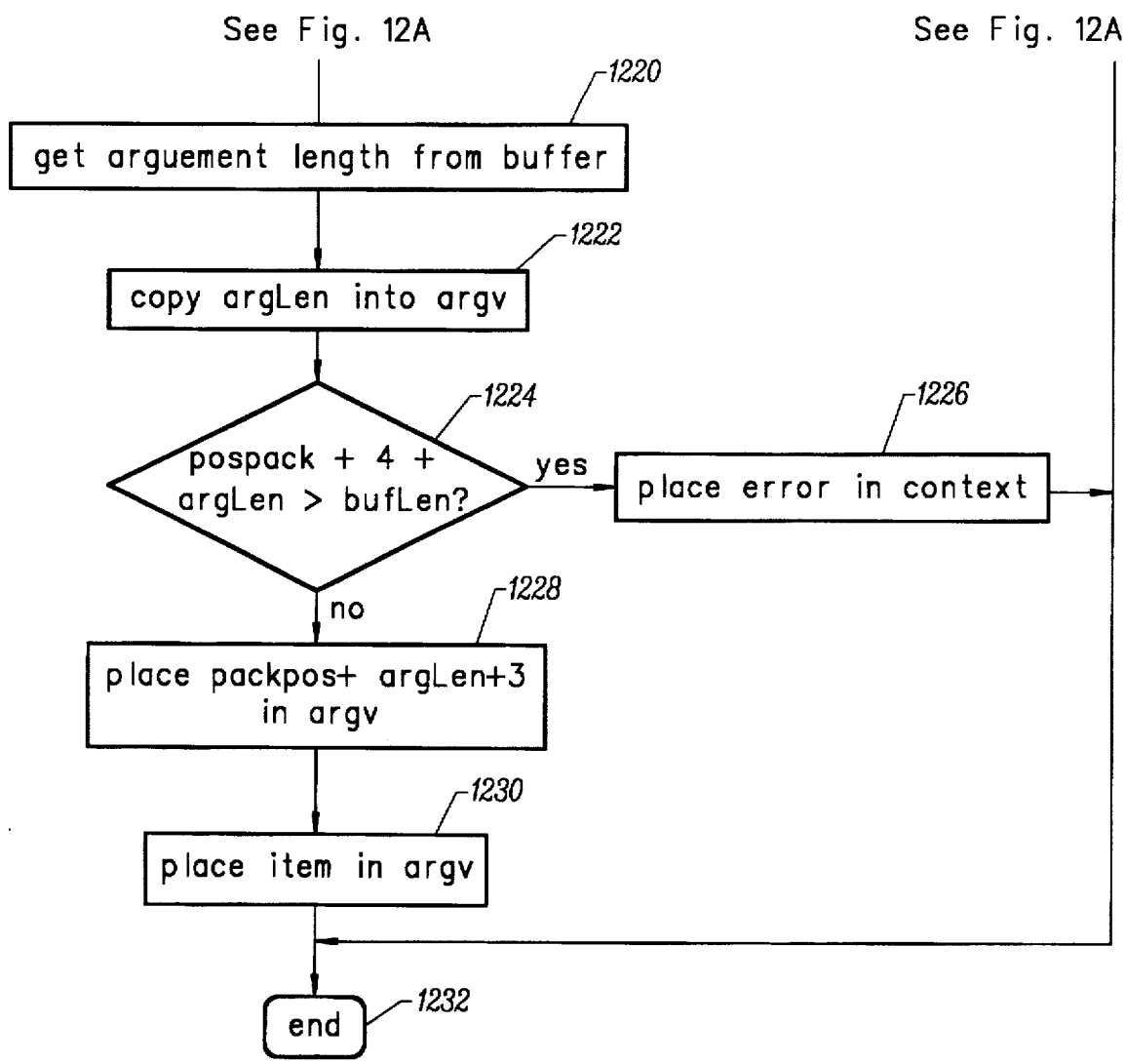

When a record is obtained from a pipe, it is placed in a local buffer. The local buffer can be accessed by the requesting session to obtain the record using CopyFromBuffer. FIG. 12 illustrates a CopyFromBuffer process flow. At block 1202, the packpos is obtained from argv. At block 1204, the buffer and the length of the buffer is obtained. At decision block 1206 (i.e., "second and third arguments obtained?"), if the second and third arguments cannot be obtained, processing continues at block 1208 to handle the error, and processing ends at block 1232.

If the second and third arguments are obtained, processing continues at decision block 1210. At decision block 1210 (i.e., "packpos+4>bufLen?"), if the space in the buffer for said record is not large enough to contain the record, processing continues at block 1212 to process the error, and processing ends at block 1232. If the buffer does contain the record, processing continues at block 1214 to set a current buffer position at the start of the record in the buffer. At decision block 1216 (i.e., "first byte at packpos=type?"), if the first byte at the start of the record in the buffer is not the type of the item being received, processing continues at block 1218 to process the error, and processing ends at block 1232.

If the type is located at the beginning of the buffered record, processing continues at block 1220 to get the length of the argument from the buffered record. At block 1222, the length of the argument is copied into argv. At decision block 1224 (i.e., "pospack +4+argLen >buflen?") if there is not additional room in the buffer, processing continues at block 1226 to handle the error. If not, processing continues, at block 1228, to store the next position in the buffer in argv. At block 1230, the data item retrieved is stored in argv. Processing ends at block 1232.

Thus, a method and apparatus for providing interprocess communication in a Database Management System has been provided.

I claim:

1. A method of communicating between sessions executing in the memory space of a computer system to exchange a data record between the sessions, said method comprising the sequential steps of:
   a) providing a shared global area within the memory space of said computer system;
   b) providing a pipe object within the memory space of said computer system for managing said shared global area;
   c) transmitting, by a first session, a pipe designation and a predetermined data record to said shared global area;
   d) determining, by said pipe object, if a pipe having said pipe designation exists in said shared global area;
   e) creating, by said pipe object, said pipe having said pipe designation in said shared global area, if said pipe having said pipe designation does not exist; and
   f) identifying, by said pipe object, said predetermined data record in said pipe having said pipe designation.

2. The method of claim 1, wherein said step of identifying, by said pipe object, said predetermined data record in said pipe includes adding said predetermined data record to a linked list data structure in said pipe.

3. The method of claim 2, wherein said predetermined data record as added to said linked list occupies a space in said shared global area.

4. The method as in claim 3, further comprising the step of removing, by a second session, said predetermined data record from said linked list.

5. The method of claim 4, following said step of removing, by said second session said predetermined data record from said linked list, further comprising the step of freeing said space in said shared global area occupied by said predetermined record.

6. The method of claim 2, wherein said predetermined data record is a request for a second data record and wherein said linked list is a linked list of sessions, which identifies at least one session.

7. The method of claim 1, wherein said shared global area includes a plurality of pipes.

8. The method of communicating between sessions executing in the memory space of a computer system to exchange a data record between the sessions, said method comprising the sequential steps of:
   a) providing a first session with a first buffer;
   b) providing a shared memory region within the memory space of said computer system;
   c) providing a pipe object in the memory space of said computer system for managing said shared memory region;
   d) storing, by said first session, a predetermined data record to said first buffer;
   e) sending, by said first session, a pipe designation and said predetermined data record from said first buffer to said shared memory region;
   f) determining, by said pipe object, if a pipe, formed of a linked list of records and having said pipe designation, exists in said shared memory region;
   g) creating, by said pipe object, said pipe having said pipe designation in said shared memory region, if said pipe does not exist; and
   h) adding said predetermined data record to said linked list of records.

9. The method of claim 8, further comprising the steps of:
   a) providing a second session with a second buffer;
   b) sending, by said second session, a request for said predetermined data record from said pipe having said pipe designation;
   c) identifying, by said pipe object, said second session in said pipe having said pipe designation;
   d) removing, by said pipe object, said predetermined data record from said linked list of records;
   e) storing, by said pipe object, said predetermined data record to said second buffer; and
   f) receiving, by said second session, said predetermined record in said second buffer.

10. The method of claim 9, wherein said step of sending, by said second session, a request for said predetermined data record from said pipe and said step of identifying said second session, by said pipe object, in said pipe precedes said step of storing, by said first session, said predetermined data record to said first buffer.

11. The method of claim 10, following said step of sending, by said second session, a request for said predetermined data record from said pipe, further comprising the steps, of:
   a) determining, by said pipe object, if said pipe having said pipe designation exists in said shared memory region; and
   b) creating said pipe having said pipe designation in said shared memory region, if said pipe does not exist.

12. The method of claim 9, wherein:
   a) said pipe further includes a linked list of sessions, which identifies at least one session; and
   b) said step of identifying said second session in said pipe includes the step of identifying said second session in said linked list of sessions.

13. The method of claim 12, wherein said pipe further includes an exclusivity indicator.

14. The method of claim 12, wherein said pipe further includes a session waiting indicator.

15. The method of claim 9, wherein said predetermined data record as added to said linked list of records occupies a space in said shared memory region.

16. The method of claim 15, following said step of removing, by said second session, said predetermined data record from said linked list of records, further comprising the step of freeing said space in said shared memory region.

17. The method of claim 8, wherein said shared memory region includes a plurality of pipes.

18. A method of managing communications between sessions executing in the memory space of a computer system and associated with a server environment established in said computer system, comprising the steps of:
   a) providing a shared memory region in said server environment;
   b) providing a communication object in said server environment for managing said shared memory region;
   c) providing a first session associated with said server environment, said first session providing for the execution of a first set of transactions, a predetermined one of said first set of transactions generating a record;
   d) initiating a transfer upon the generation of a record, wherein said initiation step includes the steps of:
      sending, by said first session, said record and a communication path designation to said shared memory region;
      determining, by said communication object, if a communication path having said communication path designation exists;

establishing, by said communication object, said communication path having said communication path designation in said shared memory region, if said communication path does not exist; and placing, by said communication object, said record in said communication path having said communication path designation.

19. The method of claim 18 further comprising the steps of:
   a) providing a second session associated with said server environment, said second session providing for the execution of a second set of transactions, a predetermined one of said second set of transactions generating a request for said record; and
   b) completing said transfer upon the generation of a request for said record wherein said step of completing includes the steps of:
      sending, by said second session, said request and said communication path designation to said shared memory region;
      identifying, by said communication object, said second session in said communication path having said communication path designation;
      removing, by said communication object, said record from said communication path; and
      receiving, by said second session, said record.

20. A computer readable medium having a set of instructions stored therein, which when executed by a computer system, causes the computer system to perform the sequential steps of:
   a) providing a shared global area within the memory space of said computer system;
   b) providing a pipe object within the memory space of said computer system for managing said shared global area;
   c) transmitting, by a first session, a pipe designation and a predetermined data record to said shared global area;
   d) determining, by said pipe object, if a pipe having said pipe designation exists in said shared global area;
   e) creating, by said pipe object, said pipe having said pipe designation in said shared global area, if said pipe having said pipe designation does not exist; and
   f) identifying, by said pipe object, said predetermined data record in said pipe having said pipe designation.

21. The computer readable medium of claim 20, wherein the instructions for identifying, by said pipe object, said predetermined data record in said pipe includes instructions for adding said predetermined data record to a linked list data structure in said pipe.

22. The computer readable medium of claim 21, wherein said predetermined data record as added to said linked list occupies a space in said shared global area.

23. The method as in claim 22, further comprising instructions for removing, by a second session, said predetermined data record from said linked list.

24. The computer readable medium of claim 23, further comprising instructions for freeing said space in said shared global area occupied by said predetermined record.

25. The computer readable medium of claim 21, wherein said predetermined data record is a request for a second data record and wherein said linked list is a linked list of sessions, which identifies at least one session.

26. The computer readable medium of claim 20, wherein said shared global area includes a plurality of pipes.

* * * * *

UNITED STATES PATENT AND TRADEMARK OFFICE
CERTIFICATE OF CORRECTION

PATENT NO. : 5,787,300
DATED : July 28, 1998
INVENTOR(S) : Robert P. Kooi; Joyo Wijaya It is certified that error appears in the above-indentified patent and that said Letters Patent is hereby corrected as shown below:

On title page, item [19] should read --Wijaya, et al--

On title page, item [75],

The name of the inventors should be "Robert P. Kooi and Joyo Wijaya"

Signed and Sealed this

First Day of December, 1998

*Attest:*

BRUCE LEHMAN

*Attesting Officer*    *Commissioner of Patents and Trademarks*